US008832695B2

(12) United States Patent
Ujibashi

(10) Patent No.: US 8,832,695 B2
(45) Date of Patent: Sep. 9, 2014

(54) METHOD OF SCHEDULING JOBS AND INFORMATION PROCESSING APPARATUS IMPLEMENTING SAME

(75) Inventor: Yoshifumi Ujibashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 13/571,515

(22) Filed: Aug. 10, 2012

(65) Prior Publication Data
US 2013/0047164 A1 Feb. 21, 2013

(30) Foreign Application Priority Data

Aug. 19, 2011 (JP) .................................. 2011-179505

(51) Int. Cl.
*G06F 9/46* (2006.01)
*G06F 9/48* (2006.01)

(52) U.S. Cl.
CPC .................................... *G06F 9/4881* (2013.01)
USPC ........... 718/100; 718/101; 718/102; 718/104; 718/105

(58) Field of Classification Search
None
See application file for complete search history.

(56) References Cited

U.S. PATENT DOCUMENTS

| 5,881,284 | A | 3/1999 | Kubo | |
|---|---|---|---|---|
| 6,216,109 | B1* | 4/2001 | Zweben et al. | 705/7.12 |
| 7,010,788 | B1* | 3/2006 | Rehg et al. | 718/100 |
| 7,165,252 | B1* | 1/2007 | Xu | 718/102 |
| 7,920,282 | B2* | 4/2011 | Coppinger et al. | 358/1.15 |
| 8,214,836 | B1* | 7/2012 | Markov | 718/103 |
| 2002/0156669 | A1* | 10/2002 | Verhaegh et al. | 705/8 |
| 2007/0033591 | A1* | 2/2007 | Kline et al. | 718/102 |
| 2007/0038987 | A1* | 2/2007 | Ohara et al. | 717/151 |
| 2007/0044102 | A1* | 2/2007 | Casotto | 718/103 |
| 2010/0153945 | A1* | 6/2010 | Bansal et al. | 718/1 |
| 2010/0318995 | A1* | 12/2010 | Messmer et al. | 718/102 |
| 2011/0067030 | A1* | 3/2011 | Isard et al. | 718/102 |
| 2011/0161964 | A1* | 6/2011 | Piazza et al. | 718/102 |
| 2011/0246994 | A1* | 10/2011 | Kimbrel et al. | 718/102 |
| 2012/0084789 | A1* | 4/2012 | Iorio | 718/105 |
| 2012/0167101 | A1* | 6/2012 | Kandula et al. | 718/102 |
| 2013/0104136 | A1* | 4/2013 | Brech et al. | 718/102 |

FOREIGN PATENT DOCUMENTS

| JP | 09-120389 A | 5/1997 |
|---|---|---|
| JP | 09-311795 A | 12/1997 |
| JP | 2004-502235 A | 1/2004 |
| JP | 2010-182199 A | 8/2010 |

OTHER PUBLICATIONS

Sakkout et al, "Minimal Perturbation in Dynamic Scheduling", 1998, pp. 1-5.*
Duell, Jason et al., "Requirements for Linux Checkpoint/Restart," Lawrence Berkeley National Lab Technical Report (publication LBNL-49659—Checkpoint Requirements-V1-8), pp. 1-23 (May 2, 2002).

* cited by examiner

*Primary Examiner* — Charles Swift
(74) *Attorney, Agent, or Firm* — Fujitsu Patent Center

(57) ABSTRACT

A computer produces a first schedule of jobs including ongoing jobs and pending jobs which is to cause a plurality of computing resources to execute the pending jobs while preventing suspension of the ongoing jobs running on the computing resources. The computer also produces a second schedule of the jobs which allows the ongoing jobs to be suspended and rescheduled to cause the computing resources to execute the suspended jobs and pending jobs. Based on the produced first and second schedules, the computer calculates an advantage factor representing advantages to be obtained by suspending jobs, as well as a loss factor representing losses to be caused by suspending jobs. The computer chooses either the first schedule or the second schedule, based on a comparison between the advantage factor and loss factor.

12 Claims, 19 Drawing Sheets

FIG. 7

51   JOB DESCRIPTOR

| JOB IDENTIFIER | DOP | MAXIMUM EXECUTION TIME | ... |
|---|---|---|---|
| 1 | 5 | 1 DAY | ... |

METHOD OF SCHEDULING JOBS AND INFORMATION PROCESSING APPARATUS IMPLEMENTING SAME

CROSS-REFERENCE TO RELATED APPLICATION

This application is based upon and claims the benefit of priority of the prior Japanese Patent Application No. 2011-179505, filed on Aug. 19, 2011, the entire contents of which are incorporated herein by reference.

FIELD

The embodiments discussed herein relate to a computer-readable storage medium storing a job scheduling program, a method of scheduling jobs, and an information processing apparatus implementing the same.

BACKGROUND

There is a class of computer systems which execute requested jobs by using a plurality of processors, processor cores, or computing nodes managed as computing resources. For example, a computer system designed for high performance computing (HPC) includes a plurality of computing nodes as the resources for execution of jobs. Also included is a managing node that manages the schedule of jobs executed on the computing nodes. This managing node performs scheduling of jobs so as to use the computing nodes in an efficient way.

The noted computer system executes various kinds of jobs, which may be categorized into serial jobs and parallel jobs. Serial jobs are executed on a single computing resource. Parallel jobs are executed on a plurality of computing resources in a parallel fashion. In the context of parallel job processing, the term "degree of parallelism (DOP)" refers to the number of computing resources used concurrently to execute a parallel job. Different jobs may take different lengths of time to execute. Some jobs finish in a relatively short time (e.g., a few minutes to a few hours), while other jobs consume a relatively long time (e.g., a few days to a few weeks).

In view of the above aspects of jobs, job scheduling is performed for each computing resource on the basis of, for example, the types of jobs (serial or parallel), the degree of parallelism in the case of parallel jobs, and the maximum execution time of each job. One proposed scheduling system is designed to achieve a high usage ratio of at least one central processing unit (CPU). Another proposed system improves the efficiency of job scheduling, taking advantage of checkpoint and restart services. The checkpoint and restart functions enable an ongoing job to stop at a certain checkpoint and restart afterwards from that checkpoint. See, for example, the following documents:

Japanese Laid-open Patent Publication No. 2010-182199

Duell, J.; Hargrove, P.; and Roman, E., "Requirements for Linux Checkpoint/Restart," Berkeley Lab Technical Report (publication LBNL-49659), May 2002

As mentioned above, jobs may be suspended in the middle of their execution for the purpose of efficient scheduling. While some users can enjoy the advantages of this job suspension, other users may suffer a loss. For example, a typical job scheduler coordinates execution of jobs in such a way that the jobs are executed in the order they are requested. This orderly job execution is no longer the case when the scheduler is allowed to use job suspension. That is, the resulting schedule may stop an earlier-arriving job to execute a later-arriving job, and when this happens, the user who has requested the former job suffers a loss of time. Frequent occurrence of such swapping of execution order would lead to inequality of services to the users.

As can be seen from the above, the use of job suspension in scheduling is expected to improve the usage ratio of computing resources while it could bring some loss to the users. Conventional schedulers, however, suspend jobs without sufficient consideration of a balance between the expected improvement of resource usage and the risk of loss.

SUMMARY

According to an aspect of the embodiments discussed in this description, there is provided a computer-readable storage medium storing a program which causes a computer to perform a procedure including: producing a first schedule of jobs including ongoing jobs and pending jobs which is to cause a plurality of computing resources to execute the pending jobs while preventing suspension of the ongoing jobs running on the computing resources; producing a second schedule of the jobs which allows the ongoing jobs to be suspended and rescheduled to cause the computing resources to execute both the suspended jobs and pending jobs; calculating an advantage factor representing advantages to be obtained by suspending the ongoing jobs, as well as a loss factor representing losses to be caused by suspending the ongoing jobs, based on the first and second schedules that are produced; and choosing either the first schedule or the second schedule, based on a comparison between the advantage factor and loss factor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 depicts an example of job descriptors;

DESCRIPTION OF EMBODIMENTS

Figure 1:
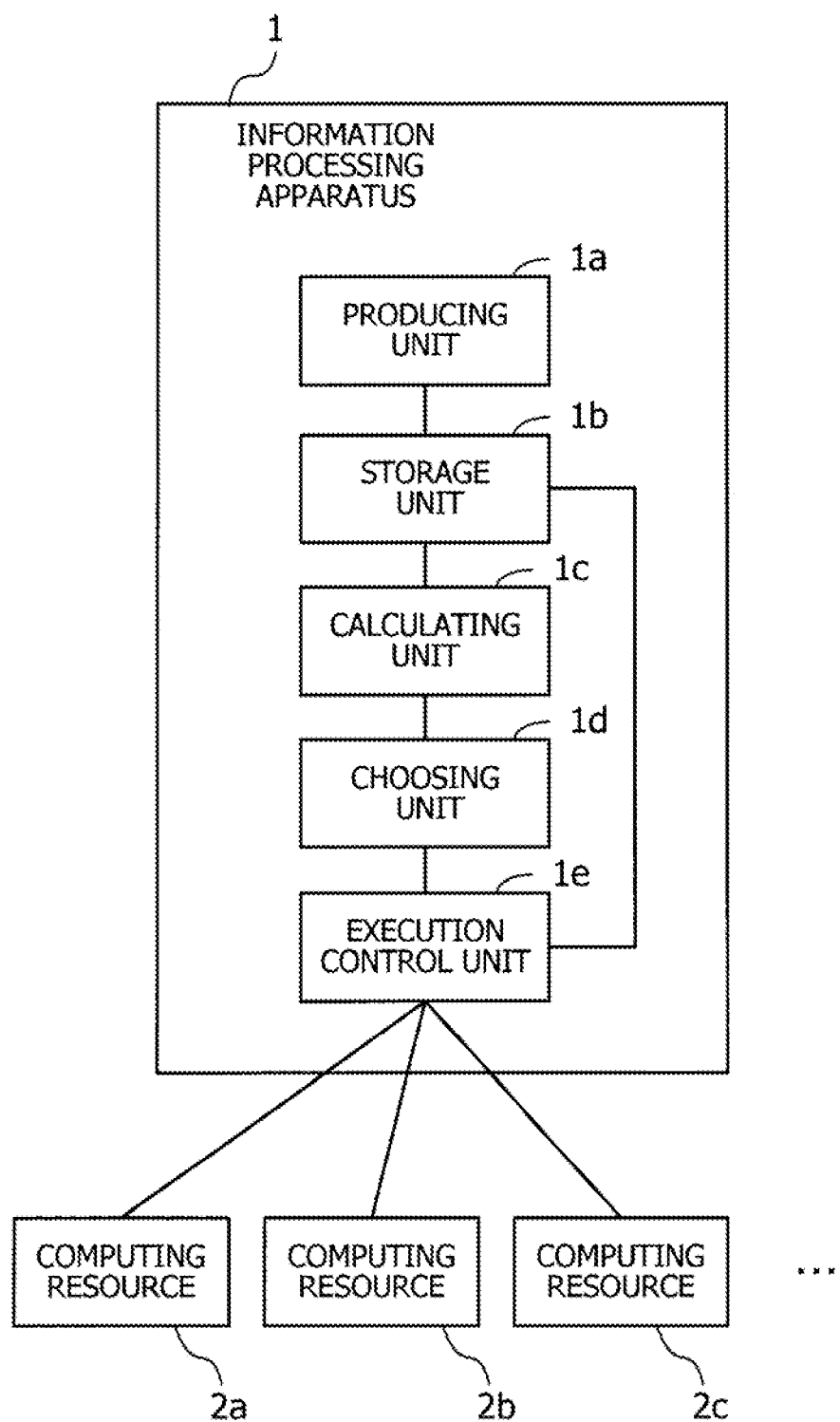
FIG. 1 illustrates an exemplary structure of functions provided in an information processing apparatus according to a first embodiment.

Several embodiments will be described below with reference to the accompanying drawings, wherein like reference numerals refer to like elements throughout. Each of those embodiments may be combined with other embodiments as long as there are no contradictions between them.

(a) First Embodiment

FIG. 1 illustrates an exemplary structure of functions provided in an information processing apparatus according to a first embodiment. The illustrated information processing apparatus 1 produces a job execution schedule for a plurality of computing resources 2a, 2b, 2c, and so on. To this end, the information processing apparatus 1 includes a producing unit 1a, a storage unit 1b, a calculating unit 1c, a choosing unit 1d, and an execution control unit 1e.

The producing unit 1a produces a first schedule and a second schedule. The first schedule is to cause a plurality of computing resources to execute jobs including ongoing jobs and pending jobs such that a plurality of computing resources execute the pending jobs while preventing suspension of the ongoing jobs running on the computing resources. The second schedule, on the other hand, allows ongoing jobs to be suspended and rescheduled to cause the computing resources to execute both the suspended jobs and pending jobs in a different way from the first schedule. For example, the producing unit 1a produces the first and second schedules on the basis of job descriptors of specific jobs whose execution has been requested. Job descriptors may include various information items about each job. For example, each job descriptor includes a job category that indicates whether the pertinent job is executed as a serial job or a parallel job. In the case of parallel jobs, their job descriptors also indicate the degree of parallelism (DOP). Also included is maximum execution time of the job. The producing unit 1a sends the produced first and second schedules to a storage unit 1b, for example. The storage unit 1b stores the first schedule and second schedules accordingly.

The calculating unit 1c calculates a value representing advantages to be obtained by suspending jobs, as well as a value representing losses caused by suspending jobs, based on the first and second schedules that are produced. The former and latter values are referred to herein as an advantage factor and a loss factor, respectively. For example, some jobs in the second schedule may have earlier start times than in the first schedule. The calculating unit 1c calculates an advantage factor from the difference between the first schedule and second schedule in terms of the start times of those jobs. More specifically, the calculating unit 1c detects jobs that can be executed immediately in the first schedule, but not in the second schedule. The calculating unit 1c then calculates the difference of execution start time of a detected job in the first and second schedules and multiplies the difference by the number of computing resources used to execute that job. The calculating unit 1c adds up the resulting products for all detected jobs, thus outputting the sum as the advantage factor.

The calculating unit 1c calculates a loss factor on the basis of the time length of suspension of jobs in the second schedule. More specifically, the calculating unit 1c detects jobs that the second schedule suspends their execution, among those running on either of the plurality of computing resources. The calculating unit 1c then multiplies the suspension time length of each detected job by the number of computing resources used to execute that job. The calculating unit 1c adds up the resulting products for all detected jobs, thus outputting the sum as the loss factor.

The choosing unit 1d chooses either the first schedule or the second schedule, based on a comparison between the advantage factor and loss factor. For example, the choosing unit 1d determines which schedule is proper, based on the ratio between the advantage and loss factors. More specifically, the choosing unit 1d divides the advantage factor by the loss factor. When the quotient is greater than a specified threshold, the choosing unit 1d chooses the second schedule as being more appropriate. The threshold for this advantage-to-loss ratio may be set to, for example, one or higher.

The execution control unit 1e commands the computing resources 2a, 2b, 2c, . . . to execute jobs according to the schedule chosen by the choosing unit 1d.

The above-described producing unit 1a, calculating unit 1c, choosing unit 1d, and execution control unit 1e may be implemented as part of the functions performed by one or more processors such as central processing units (CPU) in the proposed information processing apparatus 1. The storage unit 1b may be implemented by using, for example, a random access memory (RAM) or a hard disk drive (HDD) or other data storage devices in the information processing apparatus 1.

It is noted that the lines interconnecting the functional blocks in FIG. 1 are only an example. FIG. 1 omits some communication paths for simplicity purposes. The person skilled in the art would appreciate that there may be other communication paths in actual implementations.

Figure 2:
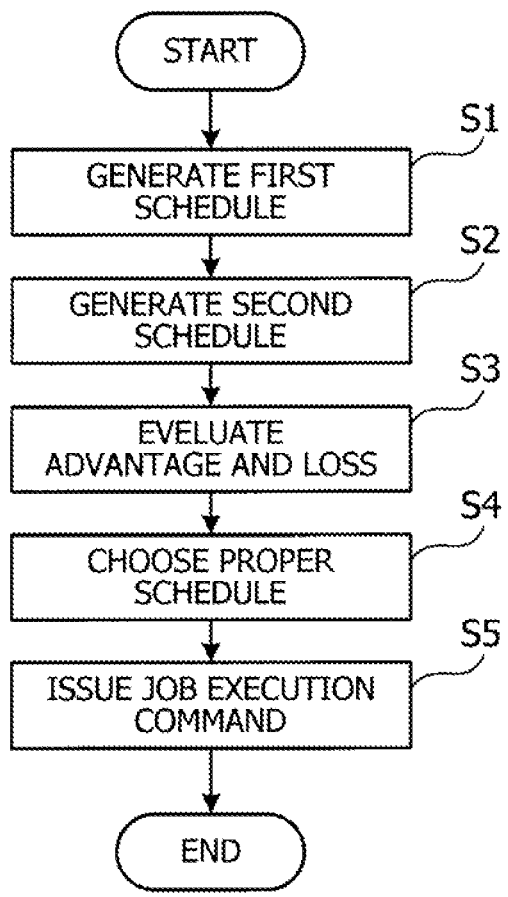
FIG. 2 is a flowchart illustrating an exemplary procedure of scheduling according to the first embodiment.

The information processing apparatus 1 performs job scheduling with the functions described above. FIG. 2 is a flowchart illustrating an exemplary procedure of scheduling according to the first embodiment. Each step of FIG. 2 will now be described below in the order of step numbers.

(Step S1) The producing unit 1a produces a first schedule that is to cause a plurality of computing resources to execute pending jobs while preventing suspension of ongoing jobs currently running on the computing resources. The producing unit 1a stores the produced first schedule in a storage unit 1b, for example.

(Step S2) The producing unit 1a produces a second schedule that allows suspension of ongoing jobs on one or more of the computing resources so as to allocate the computing resources to execute the suspended jobs and pending jobs. The producing unit 1a also stores the produced second schedule in the storage unit 1b, for example. It is noted that step S2 may be executed before step S1.

(Step S3) The calculating unit 1c retrieves the first and second schedules from the storage unit 1b, for example. Based on the retrieved first and second schedules, the calculating unit 1c calculates an advantage factor representing advantages to be obtained by suspending jobs, as well as a loss factor representing losses caused by suspending jobs.

(Step S4) The choosing unit 1d chooses either the first schedule or the second schedule based on a comparison between the advantage factor and loss factor. For example, the choosing unit 1d divides the advantage factor by the loss factor. The choosing unit 1d chooses the second schedule as being more proper than the first schedule when the quotient is greater than a specified threshold. When the quotient is smaller than or equal to the threshold, the choosing unit 1d chooses the first schedule as being more proper than the second schedule.

(Step S5) The execution control unit 1e commands the computing resources to execute jobs according to the schedule that is chosen as being more proper.

The above-described procedure enables the information processing apparatus 1 to compare two scheduling methods, one allowing job suspension and the other preventing job suspension, thereby determining which scheduling method is more proper. The jobs are then executed according to a schedule produced with one of the scheduling methods that is found more proper.

Figure 3:
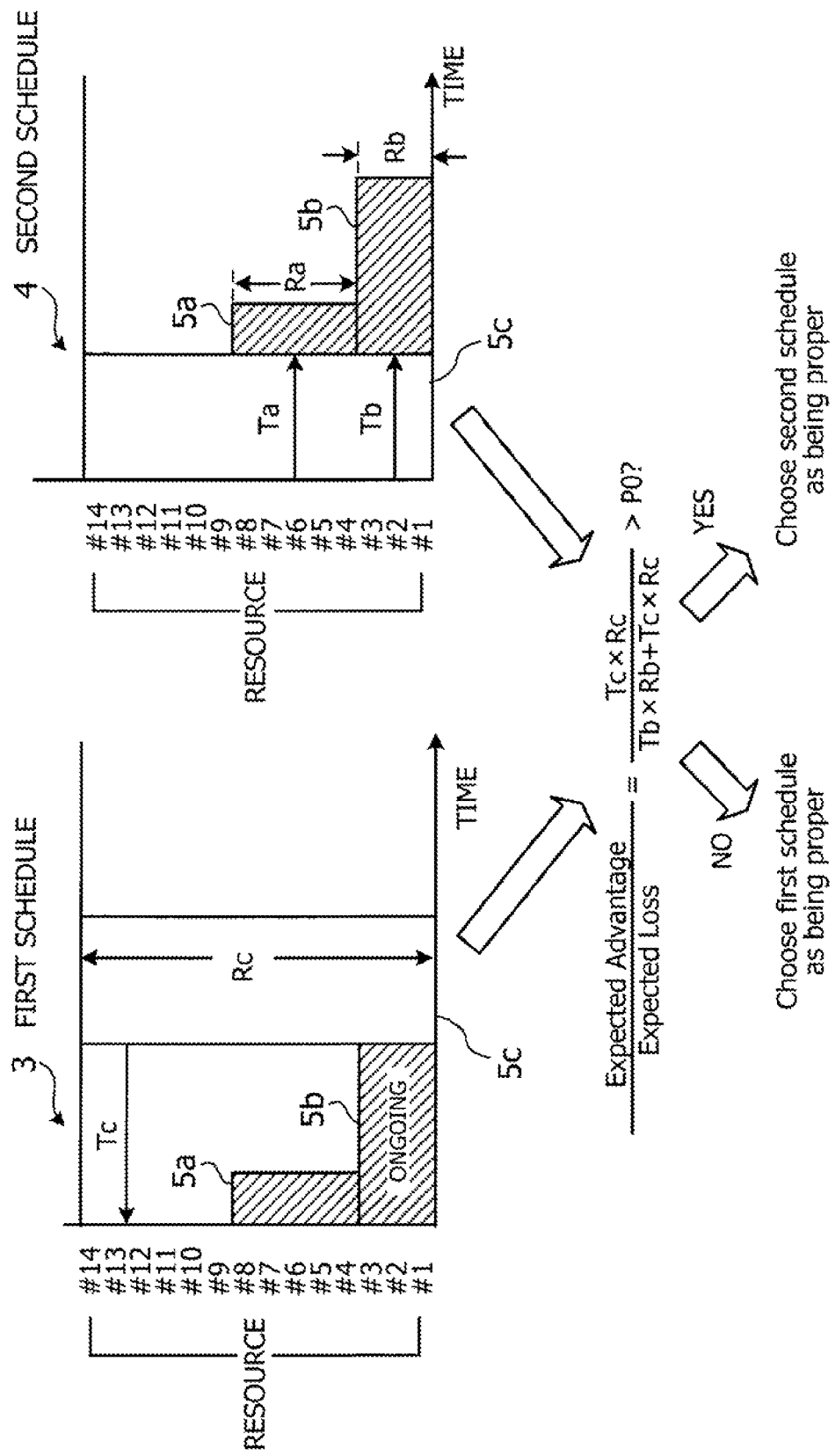
FIG. 3 illustrates an example of scheduling performed by the first embodiment.

FIG. 3 illustrates an example of scheduling performed by the first embodiment. It is assume in this example of FIG. 3 that a new job 5c is to be scheduled when two jobs 5a and 5b are running. The new job 5c has a high DOP and thus consumes all available computing resources for its execution.

Specifically, FIG. 3 depicts a first schedule 3 and a second schedule 4. According to the first schedule 3, two ongoing jobs 5a and 5b are allowed to keep running until the end. A new of 5c is initiated upon completion of the latter job 5b. According to the second schedule 4, two ongoing jobs 5a and 5b is suspended to permit immediate execution of a new job 5c. The suspended jobs 5a and 5b do not restart until this job 5c is completed.

By suspending ongoing jobs in the illustrated case, the execution start time of the new job 5c with a DOP of Rc can be advanced by Tc seconds. This may be considered to be an advantage of suspending ongoing jobs. For example, the product of (time Tc×DOP Rc) may serve as an advantage factor in the present case.

The second schedule 4, on the other hand, suspends one job 5a with a DOP of Ra for Ta seconds, as well as another job 5b with a DOP of Rb for Tb seconds. These values are used to calculate a loss factor of suspending ongoing jobs. For example, the sum of products (time Ta×DOP Ra) and (time Tb×DOP Rb) may serve as a loss factor in the present case.

The above advantage factor is then divided by the loss factor. When the quotient exceeds a specified threshold P0, the second schedule 4 is chosen as being more proper than the first schedule 3. When the quotient is smaller than or equal to the threshold P0, the first schedule 3 is chosen as being more proper than the second schedule 4.

The threshold P0 may be assigned a value of one or higher, for example. It is noted here that the act of suspending jobs could involve some risk of undesired effects, and the threshold P0 may thus be determined with consideration of such risks. For example, a higher threshold P0 makes it harder for a schedule including suspended jobs to be chosen. Accordingly, the threshold P0 may be raised in the case where a greater risk is expected, so that job suspension is applied only when the expected merit overwhelms the risk.

Possible risks in suspending jobs include failure in stopping and resuming a job, which leads to a low processing efficiency because the failed job has to be re-executed from scratch. When there is a relatively high probability of such failure, setting a higher threshold P0 would therefore be a solution to the noted problem.

As can be seen from the above, the first embodiment makes it possible to produce a schedule of jobs while balancing the advantage of suspending ongoing jobs against the loss of the same. In other words, the proposed techniques avoid overuse of job suspension and enable the system to deliver its service equally among the requesting users.

(b) Second Embodiment

This section describes a second embodiment which enables appropriate scheduling of jobs in a computer system formed from a plurality of computing nodes. It is noted here that the term "freezing" will be used in this description to refer to the act of suspending jobs. It is also noted that the second embodiment performs job scheduling by taking into account how the usage ratio of computing resources is improved by freezing jobs, beside considering the expected advantage and loss of job freezing as in the first embodiment.

Job freezing may contribute to an improved usage ratio of resources, but this is not always the case. In some cases, the use of job freezing makes no difference to the usage of computing resources, and there is no merit in attempting to improve the usage ratio while taking risks. In the context of HPC, however, it is not easy to quantify the improvement of usage ratio of resources because of the presence of a wide variety of jobs which may number in the hundreds or thousands. The second embodiment is thus designed to quantify how much improvement of usage ratio of computing nodes can be achieved by freezing jobs.

Figure 4:
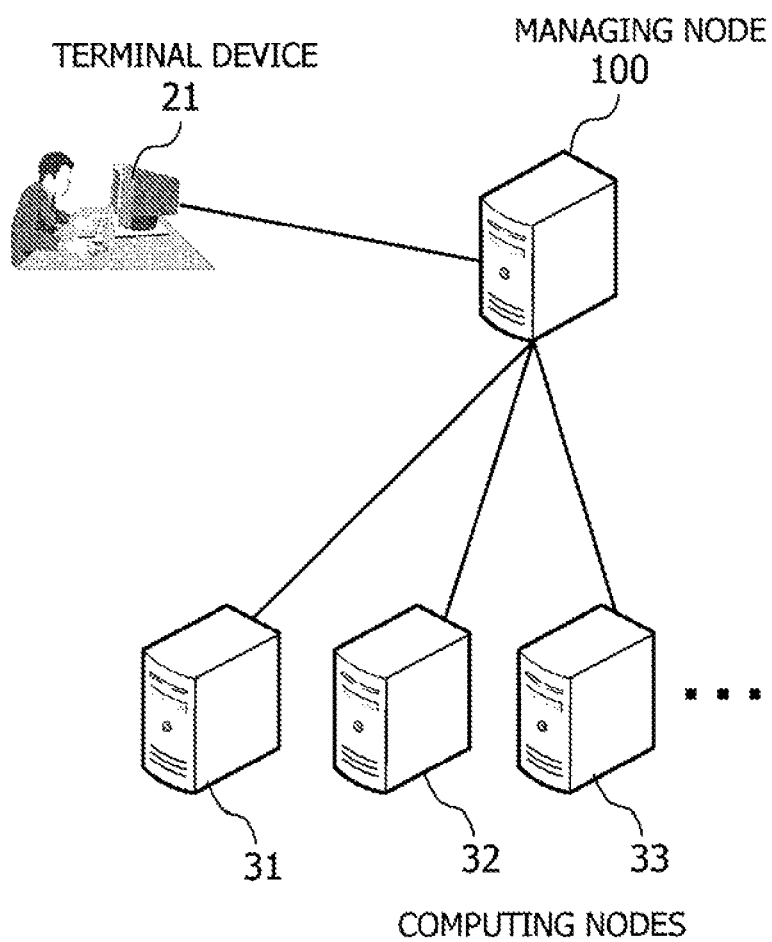
FIG. 4 illustrates an exemplary system configuration according to a second embodiment.

FIG. 4 illustrates an exemplary system configuration according to the second embodiment. The illustrated system includes a plurality of computing nodes 31, 32, 33, . . . and a managing node 100 connected to them. The managing node 100 is a computer for managing computing nodes 31, 32, 33, . . . that actually execute jobs. When a parallel job is requested, the computing nodes 31, 32, 33, . . . work together in a coordinated way to execute the requested job.

Connected to the managing node 100 is a terminal device 21. This terminal device 21 is a computer for a user to send instructions to the computing nodes 31, 32, 33, . . . as to what jobs to execute. For example, the user enters details of each job that he/she wishes to do. More specifically, the user specifies which programs and data to use for execution of jobs, whether they are serial jobs or parallel jobs, and how much time is taken at the maximum to execute the jobs (i.e., maximum execution times). Those pieces of information are sent from the terminal device 21 to the managing node 100 according to the user's instructions.

The managing node 100 receives a job execution request from the terminal device 21. The managing node 100 distributes this job execution request to the computing nodes 31, 32, 33, . . . and receives the result of executed jobs from them.

Figure 5:
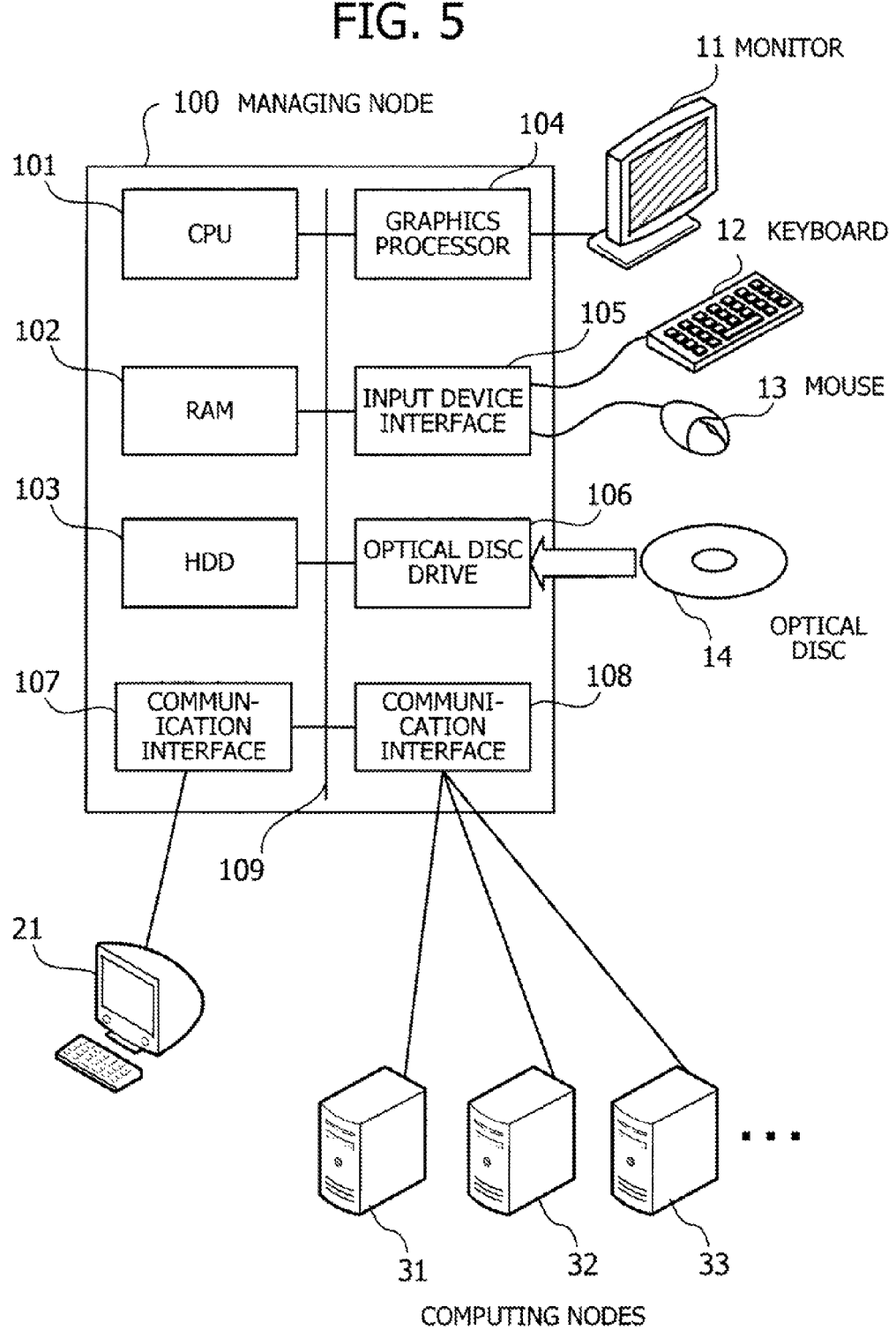
FIG. 5 illustrates an exemplary hardware configuration of a managing node used in the embodiments.

FIG. 5 illustrates an exemplary hardware configuration of a managing node used in the embodiments. The illustrated managing node 100 has a CPU 101 to control its entire operation. The CPU 101 is connected to a RAM 102 and other various peripheral devices on a bus 109. The RAM 102 serves as primary storage of the managing node 100. Specifically, the RAM 102 is used to temporarily store the whole or part of operating system (OS) programs and application programs that the CPU 101 executes, in addition to other various data objects that it manipulates at runtime.

The peripheral devices on the bus 109 include an HDD 103, a graphics processor 104, an input device interface 105, an optical disc drive 106, and communication interfaces 107 and 108. The HDD 103 writes and reads data magnetically on its internal disk media. The HDD 103 serves as secondary storage of the managing node 100 to store program and data files of the operating system and applications. Flash memory and other semiconductor memory devices may also be used as secondary storage, similarly to the HDD 103. The graphics processor 104, coupled to a monitor 11, produces video images in accordance with drawing commands from the CPU 101 and displays them on a screen of the monitor 11. The monitor 11 may be, for example, a cathode ray tube (CRT) display or a liquid crystal display.

The input device interface 105 is connected to input devices such as a keyboard 12 and a mouse 13 and supplies signals from those devices to the CPU 101. The mouse 13 is a pointing device, which may be replaced with other kinds of pointing devices such as touchscreen, tablet, touchpad, and trackball. The optical disc drive 106 reads out data encoded on an optical disc 14, by using laser light. The optical disc 14 is a portable data storage medium, the data recorded on which can be read as a reflection of light or the lack of the same. The optical disc 14 may be a digital versatile disc (DVD), DVD-RAM, compact disc read-only memory (CD-ROM), CD-Recordable (CD-R), or CD-Rewritable (CD-RW), for example.

One communication interface 107 is used to connect with a terminal device 21 via a network link. This communication interface 107 permits the CPU 101 to exchange data with the terminal device 21. Another communication interface 108 is connected to a plurality of computing nodes 31, 32, 33, . . . via network links. This communication interface 108 permits the CPU 101 to exchange data with those computing nodes 31, 32, 33, and so on.

The above-described hardware platform may be used to realize the processing functions of the second embodiment and other embodiments discussed in this description. While FIG. 5 only illustrates an example of the managing node 100, the same hardware configuration may also apply to the computing nodes 31, 32, 33, . . . , as well as to the information processing apparatus 1 described in the first embodiment.

Figure 6:
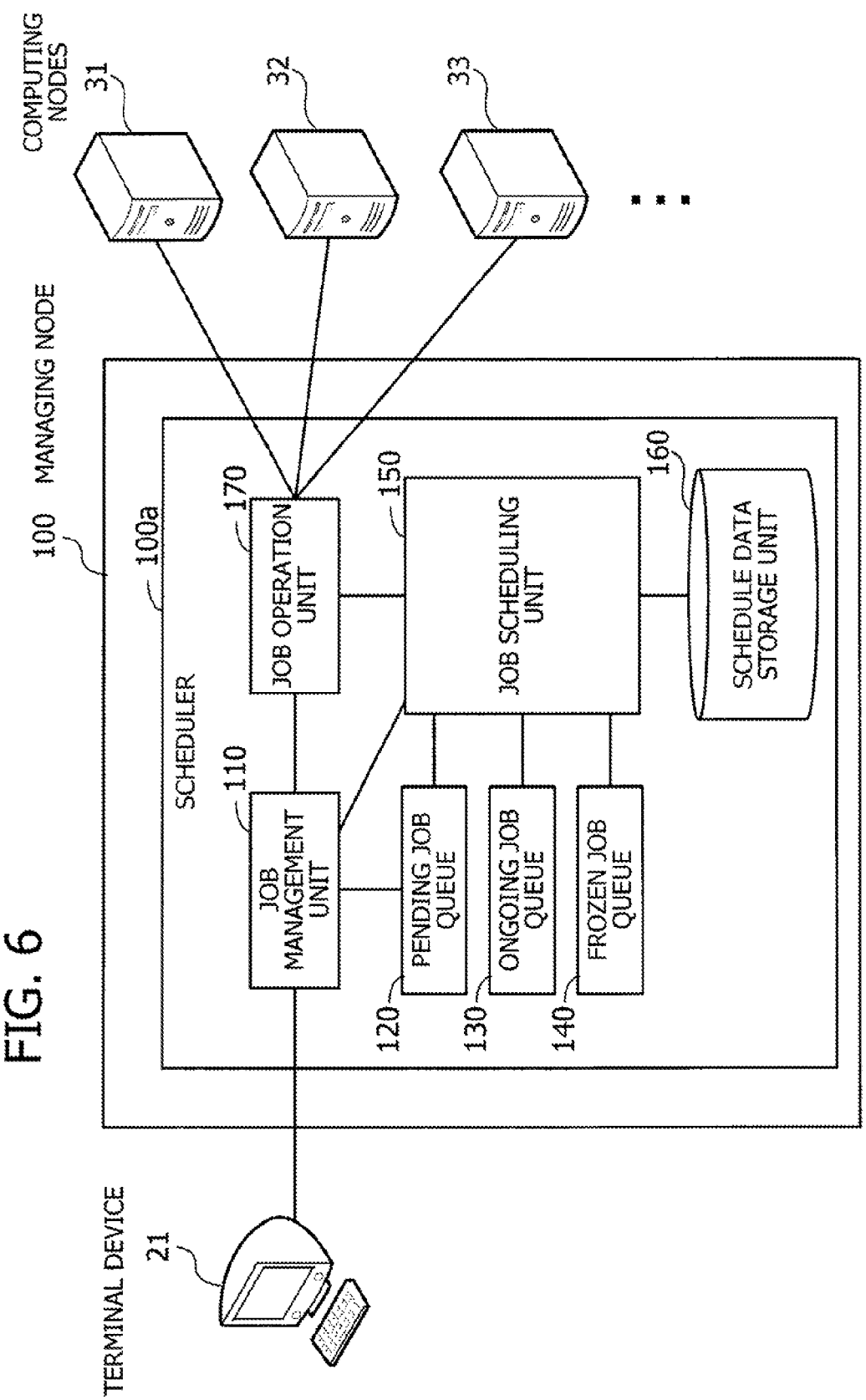
FIG. 6 is a block diagram of a managing node.

FIG. 6 is a block diagram of the managing node 100. While managing node 100 may actually have more functions, FIG. 6 only illustrates those related to the scheduling of job execution. The illustrated managing node 100 has a scheduler 100a that manages job execution schedules. Specifically, this scheduler 100a is formed from a job management unit 110, a pending job queue 120, an ongoing job queue 130, a frozen job queue 140, a job scheduling unit 150, a schedule data storage unit 160, and a job operation unit 170.

The job management unit 110 produces, in response to a job execution request from the terminal device 21, job descriptors that describe the details of each job specified in the execution request. The produced job descriptors include various data elements that will be used to execute the specified jobs. For example, each job descriptor includes information that uniquely specifies a program and data files passed to that program. The job management unit 110 enters (enqueues) the produced job descriptors to a pending job queue 120. The job management unit 110 also receives execution results of jobs from the job operation unit 170. The job management unit 110 then transmits the received execution result to, for example, the terminal device 21.

The job management unit 110 also makes a scheduling request to the job scheduling unit 150 at appropriate times. For example, the job management unit 110 issues a scheduling request when it has enqueued newly produced job descriptors to the pending job queue 120. The job management unit 110 may further do the same when an execution result of some job is received from the job operation unit 170.

The pending job queue 120 is a buffer that stores job descriptors of jobs in a pending state. The term "pending job" will now be used in the following description to refer to those jobs. That is, the pending job queue 120 stores job descriptors of pending jobs. The ongoing job queue 130 is a buffer that stores job descriptors of jobs being executed at the moment. The term "ongoing job" is used to refer to those jobs. That is, the ongoing job queue 130 stores job descriptors of ongoing jobs. The frozen job queue 140 is a buffer that stores job descriptors of frozen jobs. For example, the pending job queue 120, ongoing job queue 130, and frozen job queue 140 may be implemented as part of the storage space of RAM 102 or HDD 103.

The job scheduling unit 150 produces a schedule of jobs in response to a scheduling request. The produced schedule specifies how the computing nodes are supposed to execute jobs indicated by the job descriptors in the pending job queue 120. For example, the job scheduling unit 150 generates two proposed schedules, one with job freezing and the other without job freezing. The job scheduling unit 150 stores those schedules in a schedule data storage unit 160.

The job scheduling unit 150 selects an appropriate schedule from among those produced above, taking into consideration the advantages and losses expected from the job freezing. According to the selected schedule, the job scheduling unit 150 then requests the job operation unit 170 to start executable jobs. During that course, the job scheduling unit 150 supplies the job operation unit 170 with relevant job descriptors and execution resource information that specifies which hardware resources and software resources are used to execute the jobs. For example, the execution resource information may include information that allocates specific computing nodes to a specific job. Now that execution of pending jobs has been requested, the job scheduling unit 150 moves job descriptors of those jobs from the pending job queue 120 to the ongoing job queue 130.

In the case where the schedule involves freezing of jobs, the job scheduling unit 150 sends a job freezing request to the job operation unit 170. The job scheduling unit 150 also moves job descriptors of each frozen job from the ongoing job queue 130 to the frozen job queue 140. The frozen jobs are supposed to be executed afterwards according to the produced schedule. When that time comes, an execution request is sent to relevant computing nodes, and the job scheduling unit 150 relocates the job descriptors from the frozen job queue 140 to the pending job queue 120.

The schedule data storage unit 160 is where schedules are stored. For example, the schedule data storage unit 160 may be implemented as part of storage space of RAM 102 or HDD 103.

The job operation unit 170 performs various operations related to execution of jobs. For example, the job operation unit 170 may receive a job descriptor and execution resource information for execution of a specific job. In response, the job operation unit 170 issues an execution request to one of the computing nodes that is specified in the received execution resource information. This execution request may carry information designating specific programs and data objects used to execute the requested job. In the case of a parallel job, the job operation unit 170 sends its execution request to a plurality of computing nodes, so that the receiving computing nodes will work together to execute the parallel job in a coordinated way. When the computing operations are completed, the job operation unit 170 collects execution results from each computing node involved and sends them to the job management unit 110.

It is noted here that the job scheduling unit 150 in FIG. 6 is an implementation of the producing unit 1a, calculating unit 1c, and choosing unit 1d according to the first embodiment discussed in FIG. 1. Also, the combination of the job scheduling unit 150 and job operation unit 170 is an implementation of the execution control unit 1e according to the first embodiment discussed in FIG. 1. Further, the schedule data storage unit 160 in FIG. 6 is an implementation of the storage unit 1b discussed in FIG. 1.

It is noted that the lines interconnecting the functional blocks in FIG. 6 are only an example. The person skilled in the art would appreciate that there may be other communication paths in actual implementations.

Referring now to FIG. 7, the details of job descriptors produced by the job management unit 110 will be described below. FIG. 7 depicts an example of job descriptors. The illustrated job descriptor 51 is formed from, among others, the following data fields: "Job Identifier," "Degree of Parallelism" (DOP), and "Maximum Execution Time." The job identifier field contains an identification (ID) number that indicates which job is to be executed. The DOP field indicates the number of nodes that work in parallel for the job. In the case of a serial job, the DOP field contains a value of "1." The maximum execution time field indicates a maximum time duration that the job may take when it is executed. While FIG. 7 does not depict explicitly, the job descriptor 51 may include other information such as the names of software programs, parameters, and data files used to execute the job.

The job scheduling unit 150 uses such contents of job descriptors in the pending job queue 120 in order to assign computing nodes and designate execution start times of jobs in a proposed job schedule. For example, the job scheduling unit 150 generates two proposed schedules, one with job freezing and the other without job freezing. The generated schedules are stored into the schedule data storage unit 160.

Figure 8:
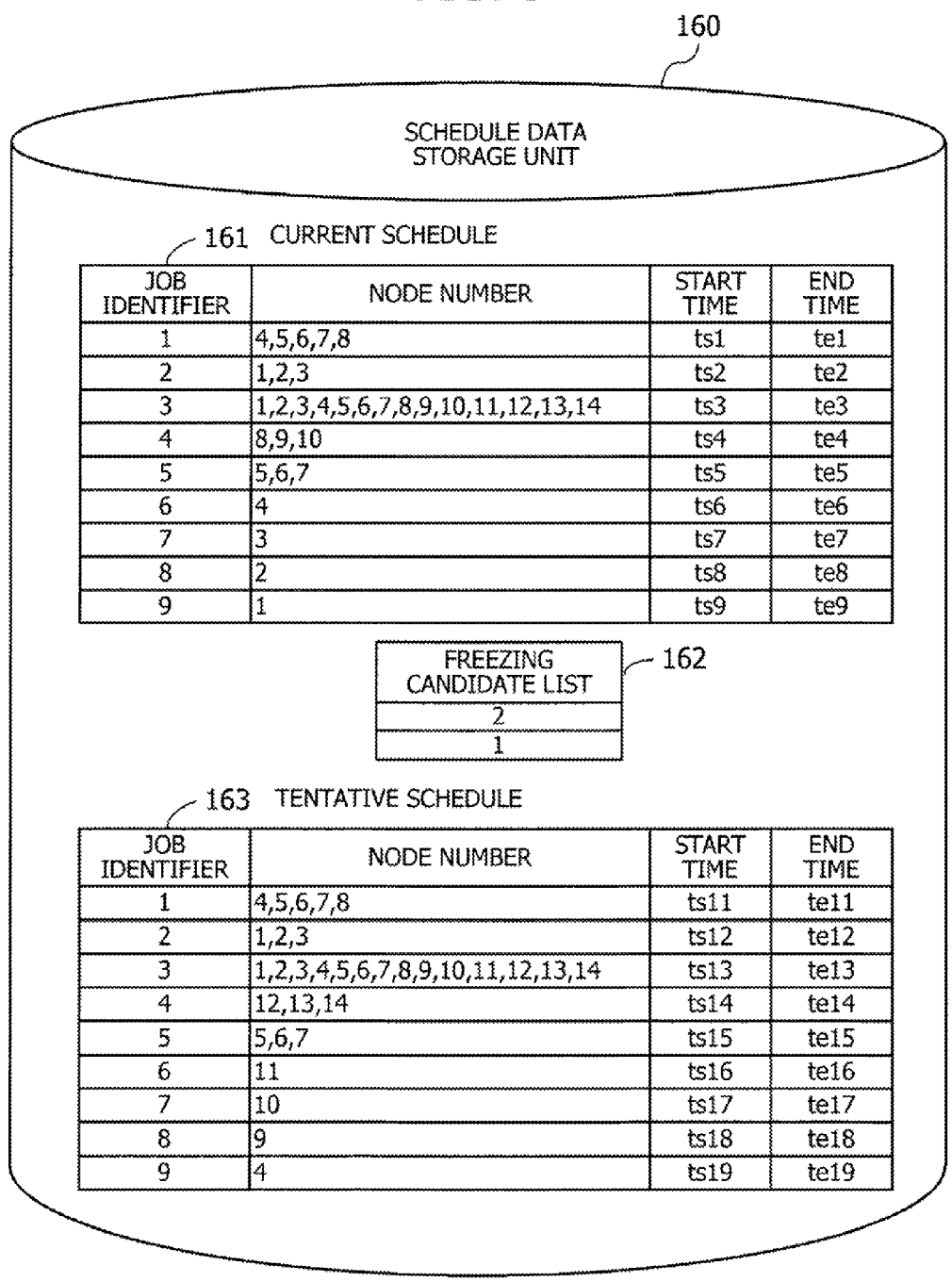
FIG. 8 illustrates an exemplary data structure of a schedule data storage unit.

FIG. 8 illustrates an exemplary data structure of the schedule data storage unit 160. The illustrated schedule data storage unit 160 stores a current schedule 161, a freezing candidate list 162, and a tentative schedule 163. The current schedule 161 is what is currently applied to the execution of jobs. Specifically, the current schedule 161 is formed from the following data fields: "Job Identifier," "Node Number," "Start Time," and "End Time." The job identifier field contains a job identifier that indicates a specific job for computing nodes, and the node number field contains node numbers indicating which computing nodes are assigned to that job. When the job is a serial job, the node number field contains one node number. When the job is a parallel job, the node number field contains as many node numbers as the DOP of that job. The start time field specifies when the job is scheduled to start, and the end time field indicates when the job is expected to end. Here the execution end time of a job is calculated by adding its maximum execution time to its execution start time.

The freezing candidate list 162 is a list of jobs that may be frozen, which is used as a source of a tentative schedule. More specifically, the freezing candidate list 162 enumerates job identifiers of jobs that are selected as the subject of job freezing operation.

The tentative schedule 163 is created in the course of schedule optimization by freezing the jobs named in the freezing candidate list 162, for the purpose of comparison with the current schedule 161. When the tentative schedule 163 is determined to be more proper than the current schedule 161, the jobs currently named in the freezing candidate list 162 are brought to a frozen state, and the current schedule 161 is updated accordingly. The tentative schedule 163 is formed from the following data fields: "Job Identifier," "Node Number," "Start Time," and "End Time." These data fields are similar to their counterparts in the current schedule 161 described above.

With the above-described functions, the proposed scheduler 100a issues job execution requests to computing nodes 31, 32, 33, . . . so that the requested jobs are executed in an efficient way. It is noted that the lines interconnecting the functional blocks in FIG. 6 are only an example. The person skilled in the art would appreciate that there may be other communication paths in actual implementations.

Figure 9:
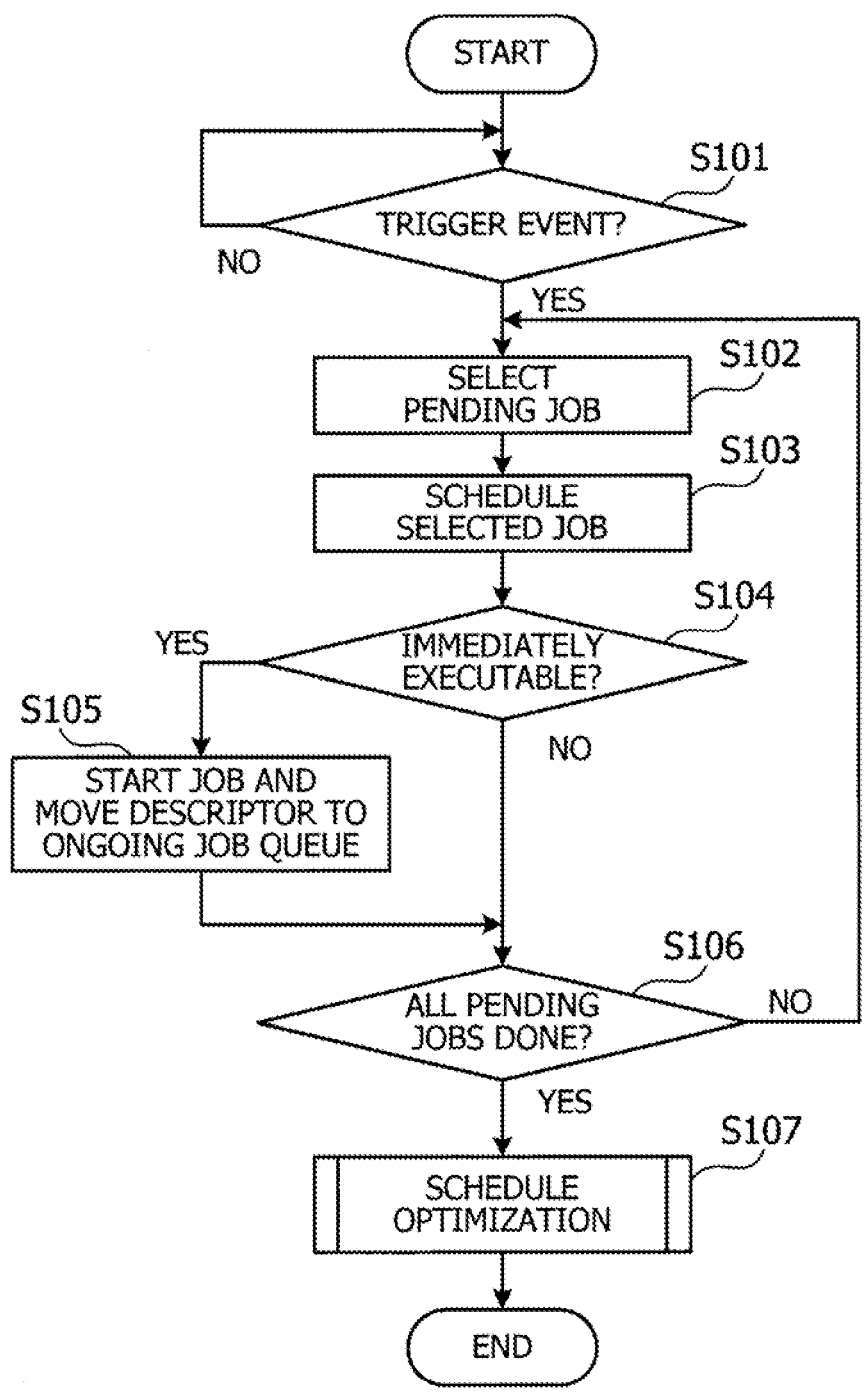
FIG. 9 is a flowchart illustrating a procedure of scheduling.

The managing node 100 performs job scheduling as will be described in detail below. FIG. 9 is a flowchart illustrating a procedure of scheduling. Each step of FIG. 9 will be described below in the order of step numbers.

(Step S101) The job scheduling unit 150 determines whether there is any event that triggers a scheduling procedure. Such trigger events may be, for example, when a job request is received from a terminal device 21, or when the execution of a job is completed at computing nodes. Also included is a "next-scheduled event," which refers to an event that comes next in the currently applied job schedule. For example, this type of event occurs at the time of start or end of a job.

Specifically, the job scheduling unit 150 may generate next-scheduled events, with reference to the latest schedule stored in the schedule data storage unit 160.

When a trigger event occurs, the job scheduling unit 150 proceeds to step S102 after deleting data of relevant pending jobs in the current schedule 161 in the schedule data storage unit 160. Otherwise, the job scheduling unit 150 repeats step S101 until a trigger event is observed.

(Step S102) Some pending jobs have been waiting in the pending job queue 120. The job scheduling unit 150 selects those pending jobs one at a time, from the top position of the pending job queue 120.

(Step S103) The job scheduling unit 150 schedules the selected job. For example, the job scheduling unit 150 assigns the selected job to a vacant time period in one or more of the computing nodes, based on the job category (i.e., serial job or parallel job), degree of parallelism, and maximum execution time of that job. The computing nodes have such time periods in which no jobs are assigned. The job scheduling unit 150 searches vacant time periods available in the computing nodes to find one that comes as earlier as possible to execute the selected job. The job scheduling unit 150 then allocates the found time period for execution of the selected job. In the case where the selected job is a parallel job, its degree of parallelism has to be taken into account when seeking vacant time periods. That is, the selected parallel job is assigned to a time period in which as many computing nodes as the DOP of that job are available. The job scheduling unit 150 updates the current schedule 161 in the schedule data storage unit 160 with an entry for the newly scheduled job.

(Step S104) The job scheduling unit 150 determines whether the selected job can be executed immediately. For example, the job scheduling unit 150 checks the start time of the time period allocated at step S103. When that start time coincides with the current time, the job scheduling unit 150 determines that the selected job can be executed immediately. In this case, the job scheduling unit 150 advances to step S105. When the selected job is not immediately executable, the job scheduling unit 150 advances to step S106.

(Step S105) The job scheduling unit 150 causes the selected job to run on the computing node(s) determined at step S103. For example, the job scheduling unit 150 requests the job operation unit 170 to start execution of the selected job by passing its job descriptor and execution resource information. In response, the job operation unit 170 sends a job execution request to the target computing node(s) specified in the execution resource information. The job scheduling unit 150 then moves the selected job from the pending job queue 120 to the ongoing job queue 130.

(Step S106) The job scheduling unit 150 determines whether all pending jobs have been selected at step S102. For example, the job scheduling unit 150 determines whether the last selected pending job was what the pending job queue 120 contained as its endmost entry. If this test is true, it means that all pending jobs are done. When all pending jobs are done, the job scheduling unit 150 advances to step S107. When there remains a pending job, the job scheduling unit 150 returns to step S102.

(Step S107) The job scheduling unit 150 calls a schedule optimization procedure. The details of this schedule optimization procedure will be described later with reference to FIG. 12.

The above-described steps S101 to S106 produce a schedule of jobs, which is referred to herein as a "current schedule." The current schedule is then subjected to optimization.

Figure 10:
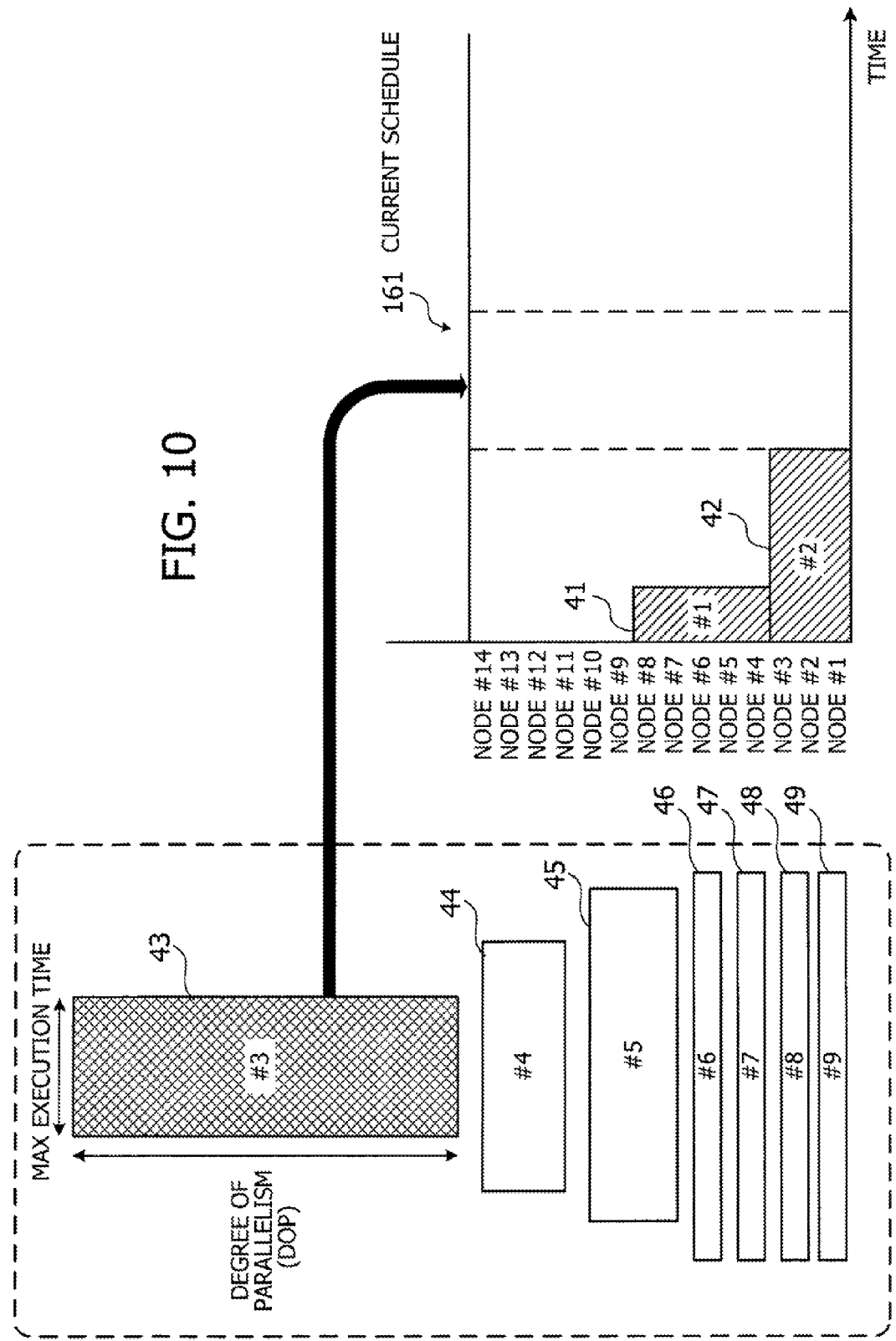
FIG. 10 depicts an exemplary process of scheduling pending jobs.

FIG. 10 depicts an exemplary process of scheduling pending jobs. In this particular example of FIG. 10, there are nine jobs 41 to 49 for fourteen computing nodes #1 to #14. Each job 41 to 49 is represented in the form of a rectangle containing a job identifier. The height and width of each rectangle respectively represent the DOP and maximum execution time of the pertinent job.

Seen in the right half of FIG. 10 is a job schedule, which indicates how the assignment of jobs to computing nodes changes over the course of time (i.e., in the direction of horizontal axis). Each scheduled job is associated with one or more node numbers, as well as with a specific time period, thus indicating which computing nodes will execute the job in which time period.

Specifically, two jobs 41 and 42 out of the nine jobs 41 to 49 have already been assigned to vacant periods of several computing nodes. The remaining jobs 43 to 49 reside in the pending job queue 120 as seen in the left half of FIG. 10. Here the vertical positions of jobs in FIG. 10 represent the locations of their job descriptors in the pending job queue 120. That is, the topmost job #3 seen in FIG. 10 is located nearest to the output end of the pending job queue 120. In other words, job #3 43 is the next job that will be selected for scheduling.

Job #3 43 has a DOP of 14, meaning that the job is supposed to fully use the fourteen computing nodes in a parallel fashion. In the example seen in FIG. 10, the current schedule 161 allocates eight computing nodes for job #1 41 and job #2 42, while leaving only six computing nodes available for other jobs in that same period. It is therefore not possible to execute job #3 43 until after the preceding jobs 41 and 42 are completed. The job scheduling unit 150 thus places job #3 43 in a vacant time period after the existing job #2 42. It is noted that this scheduling leaves many unused computing nodes in the period before the scheduled execution time of job #3 43.

Figure 11:
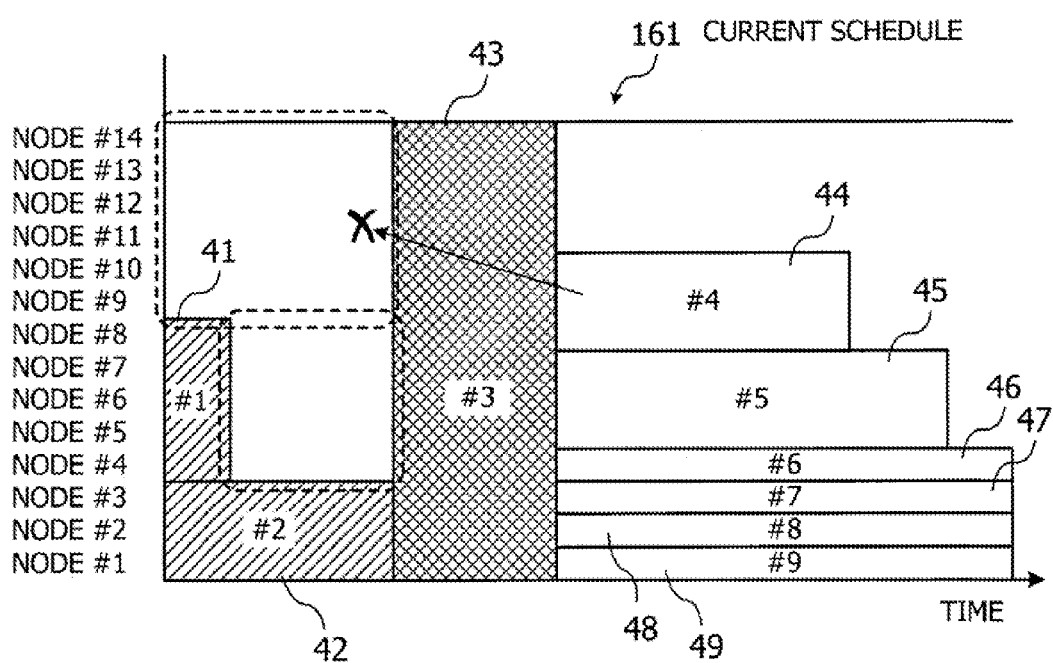
FIG. 11 depicts an example of scheduling results.

Now that job #3 43 has been placed in the schedule, the job scheduling unit 150 proceeds to scheduling of other jobs 44 to 49. FIG. 11 depicts an example of scheduling results. As can be seen from FIG. 11, the maximum execution times of those jobs 44 to 49 are too long to fit into the vacant time periods before the execution of the highly parallel job #3 43, as indicated by the arrow and broken-line boxes. The job scheduling unit 150 therefore places all remaining jobs 44 to 49 in a time period after job #3 43.

The problem of the schedule of FIG. 11 is that many computing nodes have an unused time period before job #3 43 begins. This means a poor usage ratio of computing nodes. A more efficient schedule can be produced if it is possible to freeze the execution of two preceding jobs 41 and 42 in this situation. The job scheduling unit 150 thus initiates a schedule optimization procedure to try this job freezing after a schedule is produced without using the same.

Figure 12:
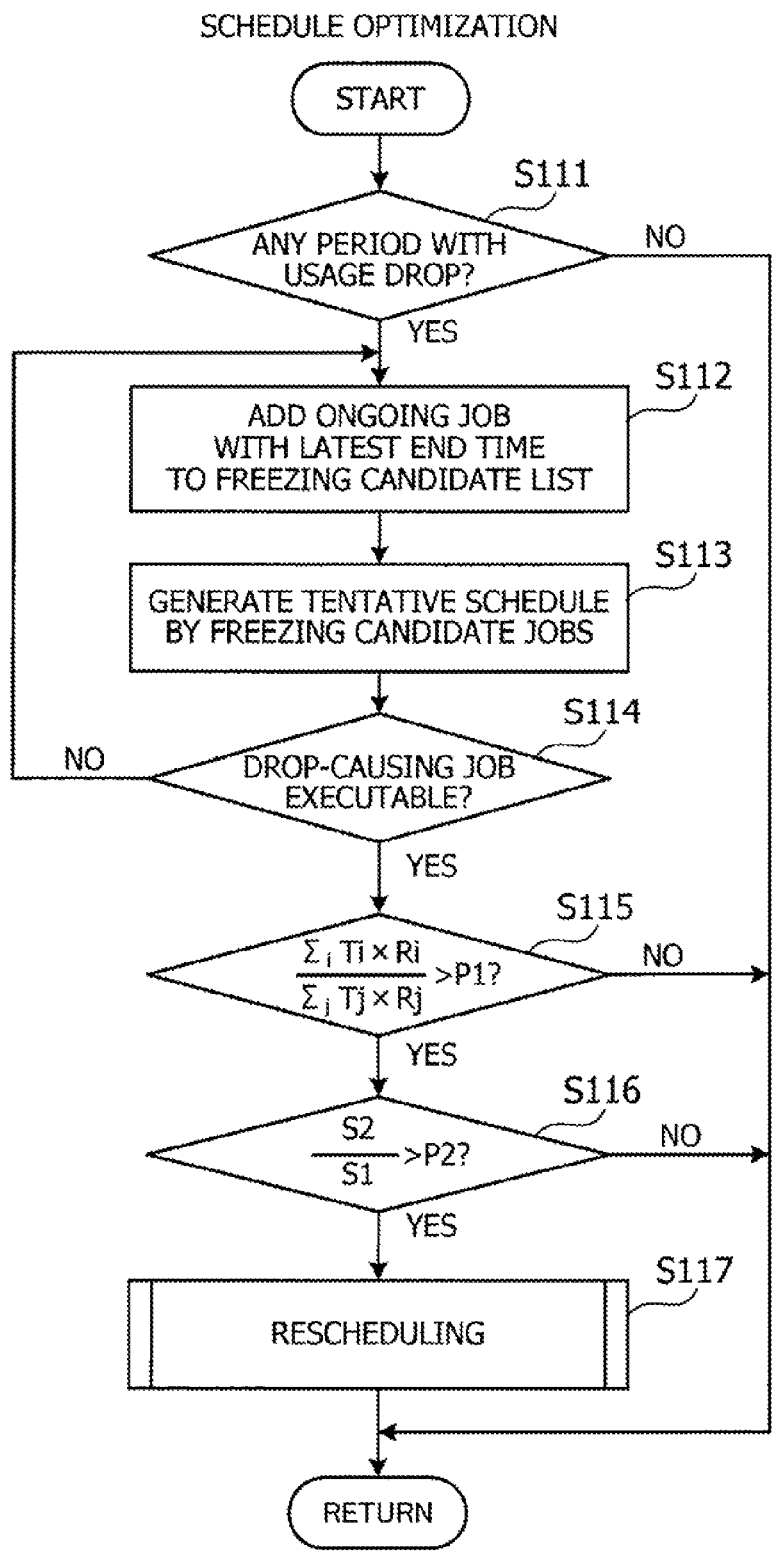
FIG. 12 is a flowchart illustrating an exemplary procedure of schedule optimization.

FIG. 12 is a flowchart illustrating an exemplary procedure of schedule optimization. Each step of FIG. 12 will be described below in the order of step numbers.

(Step S111) The job scheduling unit 150 goes through the current schedule to determine whether there is any time period during which the usage ratio reaches or falls below a specified threshold. The usage ratio may be calculated as, for example, the ratio of active computing nodes (i.e., those executing ongoing jobs) to all computing nodes that are provided. When a drop of usage ratio is observed in a certain time period, and when that time period is immediately followed by a scheduled pending job, this pending job is likely to be causing the drop of usage ratio and thus referred to herein as a "drop-causing job." When a drop of usage ratio is detected, the job scheduling unit 150 advances to step S112. When no such usage drop is found, the job scheduling unit 150 exits from this schedule optimization procedure.

(Step S112) The job scheduling unit 150 selects a job whose end time is the latest of all the ongoing jobs and adds it to the freezing candidate list. Those jobs in the freezing candidate list are referred to as "candidate jobs."

(Step S113) The job scheduling unit 150 performs tentative scheduling by freezing all jobs currently named in the freezing candidate list. For example, the job scheduling unit 150 freezes all the listed candidate jobs and arranges a schedule in such a way that the frozen jobs resume after the drop-causing job noted above. In this tentative scheduling, the job scheduling unit 150 gives priority to the candidate jobs over pending jobs. That is, the candidate jobs are scheduled to run before pending jobs. The job scheduling unit 150 stores the resulting tentative schedule 163 in the schedule data storage unit 160.

(Step S114) The job scheduling unit 150 determines whether the drop-causing job has become executable as a result of the tentative scheduling. When the drop-causing job has become executable, the job scheduling unit 150 advances to step S115. Otherwise, the job scheduling unit 150 returns to step S112 to freeze another ongoing job.

(Step S115) The job scheduling unit 150 quantifies the advantage and loss of job freezing and calculates their ratio. The job scheduling unit 150 then determines whether the calculated ratio is greater than a specified threshold. For example, this condition may be expressed as:

$$\frac{\text{Gain}}{\text{Loss}} = \frac{I_i T_i \times R_i}{I_j T_j \times R_j} > P_1 \qquad (1)$$

where the parameters i, $T_i$, $R_i$, j, $T_j$, $R_j$, and $P_1$ denote as follows. First, parameter i is an integer in the range of i≥1 to represent the job identifier of a specific job that has become executable as a result of the tentative scheduling. This job may be the drop-causing job or another job. It is noted that other jobs than the drop-causing job may become executable during the course of tentative scheduling. Parameter $T_i$ represents the amount of time that the start time of job #i is moved ahead by the tentative scheduling. Parameter $R_i$ represents the DOP of job #i. Parameter j is an integer in the range of j≥1 to represent the job identifier of a candidate job in the freezing candidate list. Parameter $T_j$ represents the amount of time that candidate job #j is delayed by the tentative scheduling. Parameter $R_j$ is the DOP of candidate job #j. Parameter $P_1$ is a threshold defined previously by an administrator who manages the system. For example, $P_1$ may be assigned a value of one or higher, for example.

The job scheduling unit 150 divides the advantage value by the loss value. When the quotient of this division is greater than the specified threshold $P_1$, the job scheduling unit 150 advances to step S116. Otherwise, the job scheduling unit 150 exits from this schedule optimization procedure.

(Step S116) The job scheduling unit 150 evaluates how the usage ratio of computing nodes is affected by a change from current schedule to tentative schedule. Specifically, the job scheduling unit 150 determines whether the expected improvement of usage ratios is greater than a specified threshold.

The usage ratio of computing nodes is calculated for a specific calculation period in the current schedule. For example, this calculation period begins at the current time point and terminates at the end of the drop-causing job in the current schedule. The usage ratio of computing nodes is calculated by dividing the sum of their operating times during the calculation period by the sum of their maximum operating times. Here the maximum operating time of each computing node equals to the length of the calculation period.

The above calculation usage ratio is also performed for the tentative schedule. According to the second embodiment, the same calculation period is used for both the current schedule and tentative schedule. This means that the same sum of maximum operating times in computing nodes is used in the calculation of usage ratios of the current schedule and tentative schedule. Accordingly, the improvement of usage ratios can be evaluated by comparing the sum of operating times during the calculation period in the current schedule with that in the tentative schedule. More specifically, the following condition (2) serves to determine whether the improvement of usage ratios is greater than a specific threshold.

$$\frac{S_2}{S_1} > P_2 \qquad (2)$$

where the parameters S1, S2, and P2 denote as follows. Parameter S1 is the total amount of operating times during a calculation period of usage ratios in the current schedule. Parameter S2 is the total amount of operating times during the calculation period in the tentative scheduling. Parameter P2 is a threshold defined previously by the administrator. For example, P2 may be assigned a value of one or higher.

When the improvement of usage ratios is greater than the specified threshold P2, the job scheduling unit 150 advances to step S117. Otherwise, the job scheduling unit 150 exists from this schedule optimization procedure.

(Step S117) The job scheduling unit 150 calls a rescheduling procedure which includes freezing the candidate job. The details of this rescheduling will be described later with reference to FIG. 18.

As can be seen from the above description, the job scheduling unit 150 executes tentative scheduling in consideration of job freezing when there is a time period during which the usage ratio reaches or falls below a specified threshold. The tentative scheduling changes the arrangement of jobs, causing both advantages and losses. When the advantages outweigh the losses by a certain value, and only when the usage ratio of computing nodes is improved, the job scheduling unit 150 rearranges the jobs according to the tentative scheduling.

Figure 13:
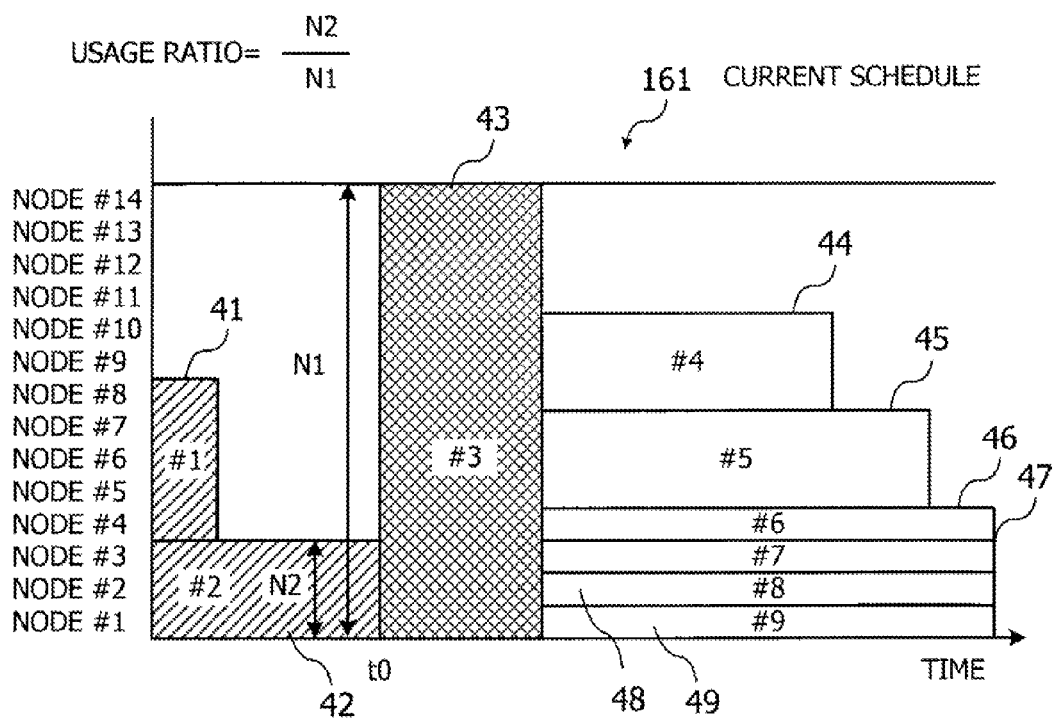
FIG. 13 illustrates how the usage ratio is evaluated.

FIG. 13 illustrates how the usage ratio is evaluated. This example of FIG. 13 assumes N1=14, i.e., fourteen computing nodes, as well as a threshold of 0.5 for the usage ratio. There is only one job #2 42 running immediately before job #3 43 begins at time t0. Since this job #2 42 is a parallel job with a DOP of 3, the number N2 of operating computing nodes at the moment immediately before t0 is three. The usage ratio (N2/N1) is therefore calculated to be 3/14, which is about 0.214.

Based on its comparison with the threshold of 0.5, the job scheduling unit 150 interprets this value as indicating a drop of usage ratio at the moment immediately before t0.

Upon detection of a drop of usage ratio, the job scheduling unit 150 updates the freezing candidate list with a new candidate job which is selected as having the latest end time of all the ongoing jobs. In the example of FIG. 13, job #2 42 is added to the freezing candidate list, and job #3 43 beginning at time t0 is designated as the drop-causing job.

Figure 14:
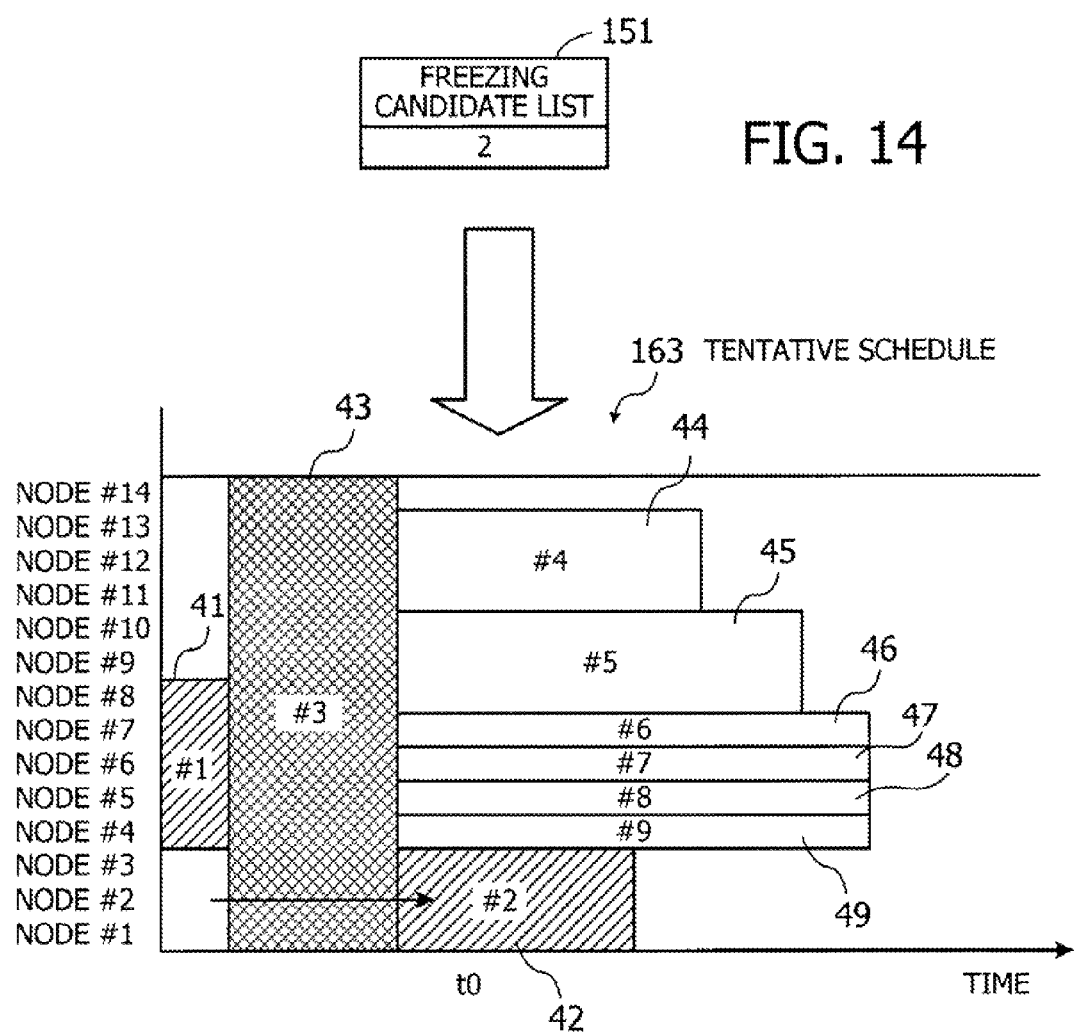
FIG. 14 illustrates how a first ongoing job is added to a freezing candidate list.

FIG. 14 illustrates how a first ongoing job is added to the freezing candidate list. The illustrated freezing candidate list 151 contains a new job identifier of 2, indicating that job #2 42 has been added as a candidate job. This event of a new entry to the freezing candidate list 151 triggers tentative scheduling that freezes the newly added candidate job. In the example of FIG. 14, the tentative scheduling freezes job #2 42 and thus causes job #2 42 and job #3 43 to swap their positions in the execution order.

While the freezing of job #2 42 may move the drop-causing job #3 43 ahead, it is still not possible to start that job #3 43 immediately. The job scheduling unit 150 therefore seeks another ongoing job for the freezing candidate list.

Figure 15:
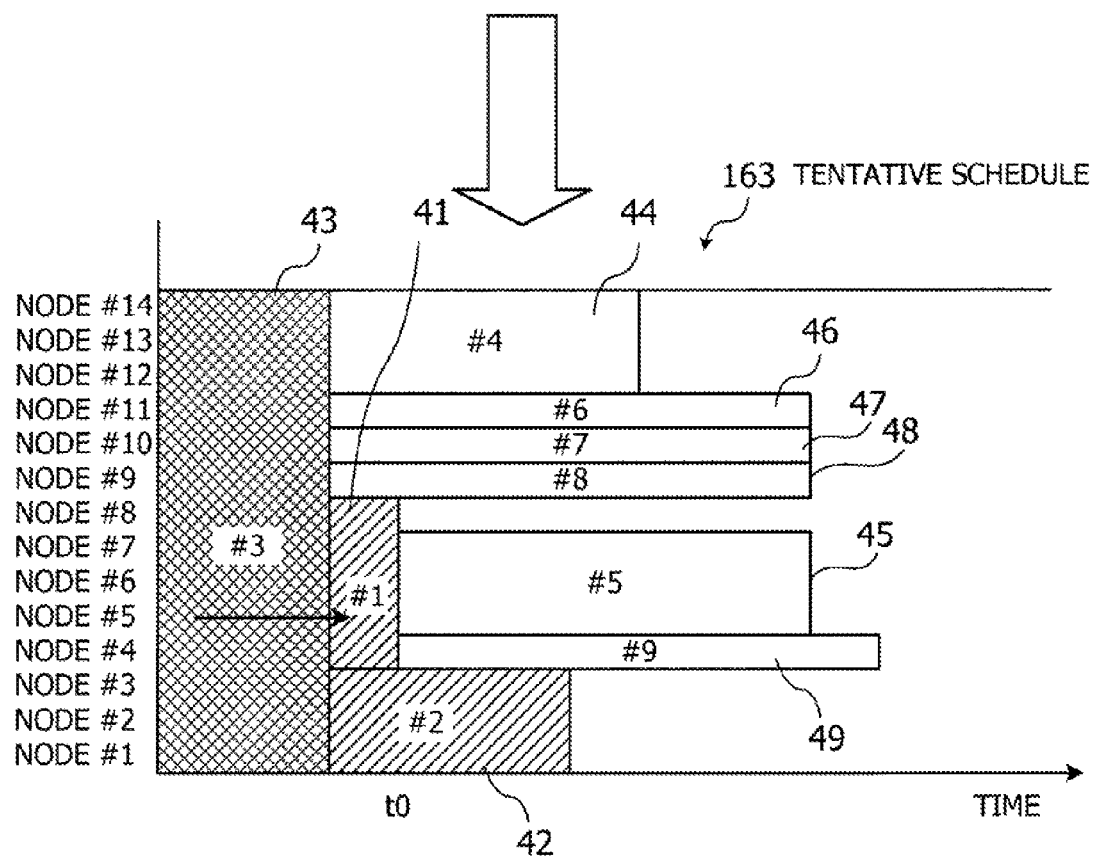
FIG. 15 illustrates how a second ongoing job is added to the freezing candidate list.

FIG. 15 illustrates how a second ongoing job is added to the freezing candidate list. The illustrated freezing candidate list 151 contains a new job identifier of 1, indicating that job #1 41 has been added as a candidate job. This event of a new entry to the freezing candidate list 151 triggers tentative scheduling that freezes the newly added candidate job. In the example of FIG. 15, the tentative scheduling freezes job #1 41 and thus causes job #1 41 and job #3 43 to swap their positions in the execution order. The drop-causing job #3 43 moves ahead and thus becomes immediately executable.

Figure 16:
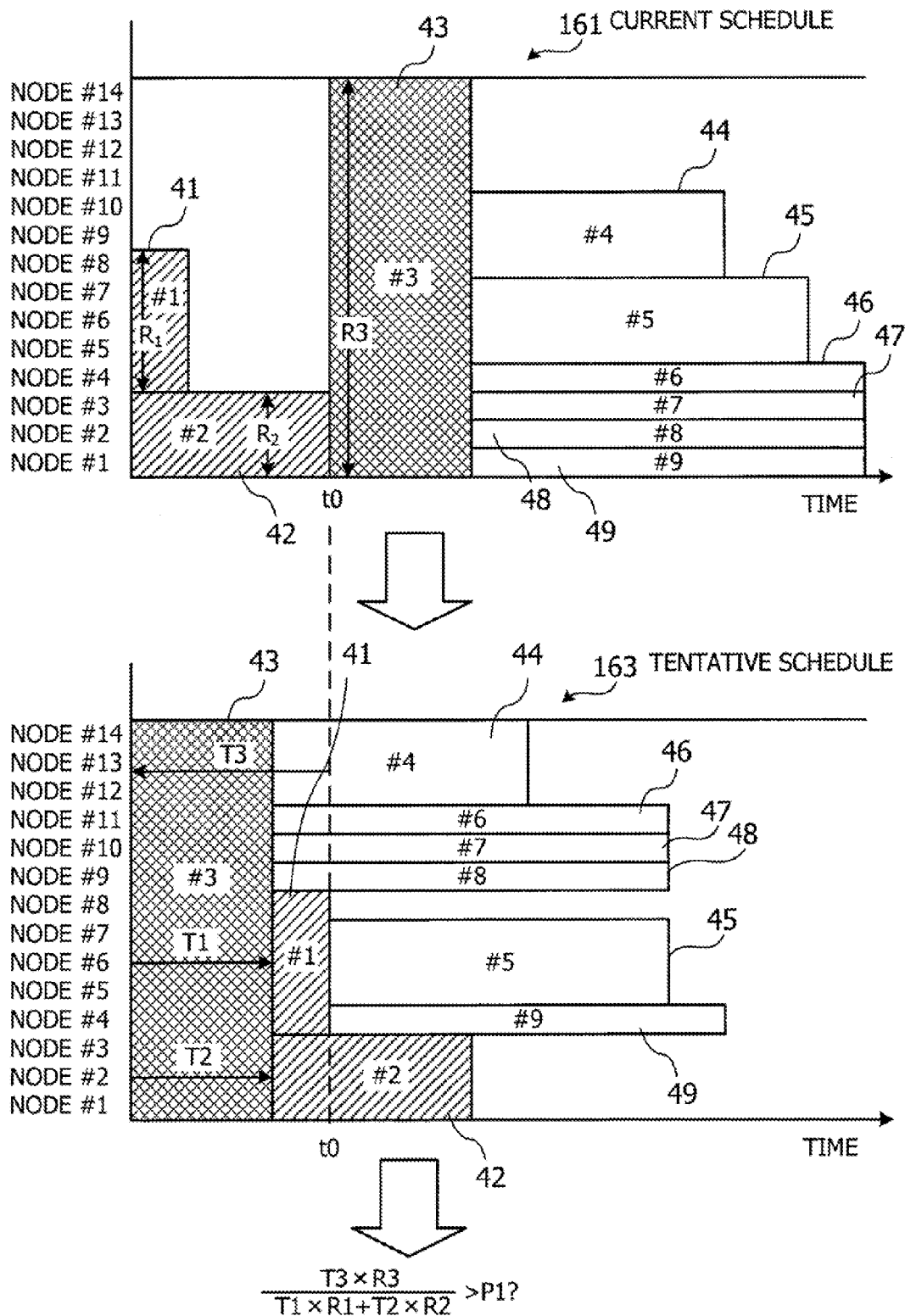
FIG. 16 illustrates an exemplary comparison between advantages and losses expected from job freezing.

Now that the drop-causing job has become executable, the job scheduling unit 150 then evaluates advantages and losses of job freezing. FIG. 16 illustrates an exemplary comparison between advantages and losses expected from job freezing. Specifically, the upper half of FIG. 16 illustrates a current schedule 161, and the lower half of FIG. 16 illustrates a tentative schedule 163. Advantages and losses of job freezing is actually evaluated in terms of how the execution start times of the drop-causing job and candidate jobs would change when the current schedule 161 was replaced with the tentative schedule 163.

Referring to the example of FIG. 16, job #3 43 is causing a drop of usage ratio. This drop-causing job #3 43 has a DOP of R3, and its start time has been moved ahead by T3 as a result of tentative scheduling. Accordingly the advantage of job freezing is calculated to be T3×R3.

Job #1 41 and job #2 42 are candidates jobs to be frozen. Specifically, job #1 41 has a DOP of R1 and is delayed by T1 as a result of tentative scheduling. Job #2 42 has a DOP of R2 and is delayed by T2 as a result of tentative scheduling. Accordingly the loss of job freezing is calculated to be (T1×R1+T2×R2). The advantage is then divided by the loss, and it is then tested whether the quotient is greater than threshold P1.

Figure 17:
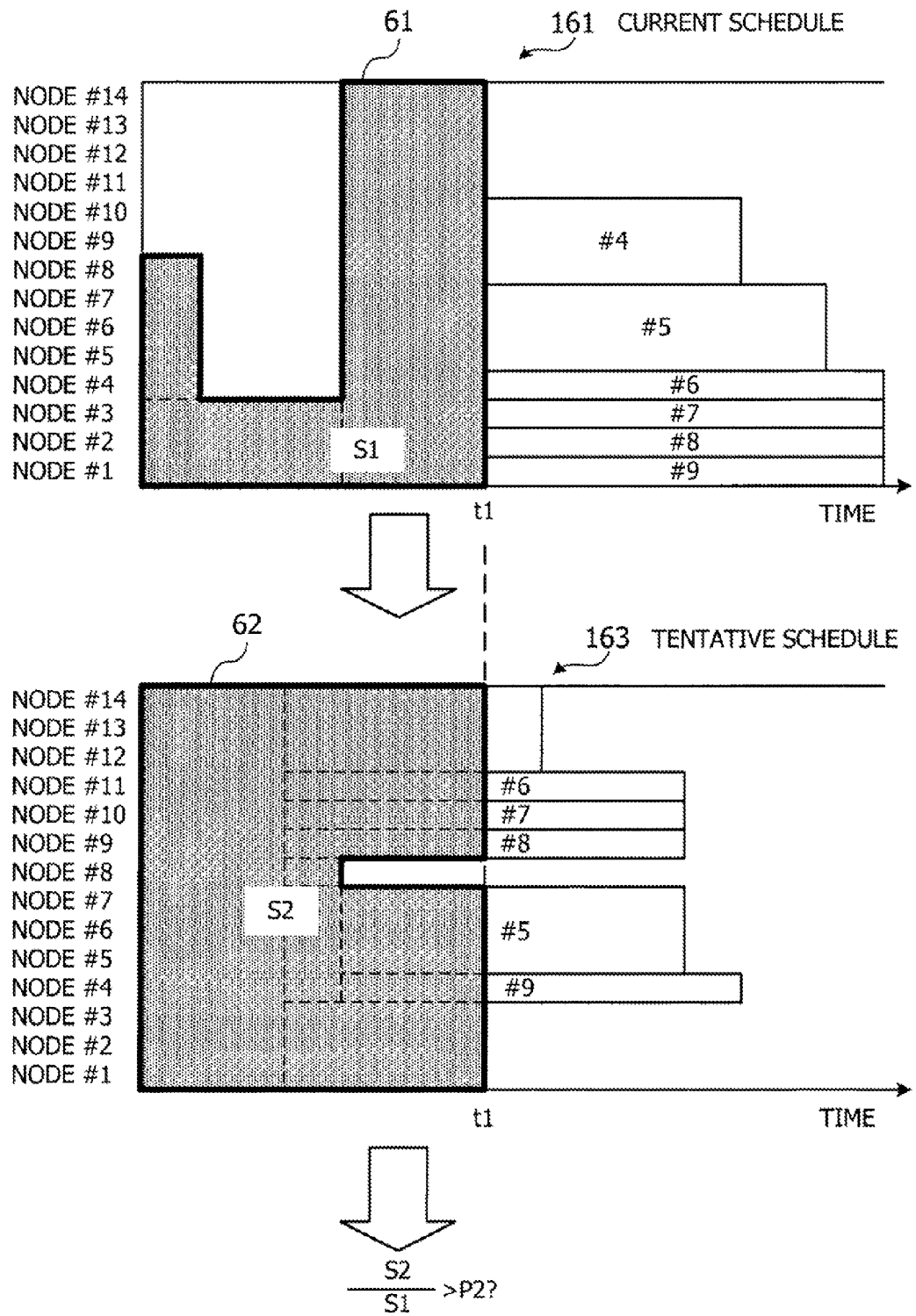
FIG. 17 illustrates evaluation of how the job freezing contributes to improvement of usage ratios.

As noted above, the tentative schedule 163 makes the drop-causing job #3 43 executable. The job scheduling unit 150 thus proceeds to the step of evaluating improvement of usage ratios. FIG. 17 illustrates evaluation of how the job freezing contributes to improvement of usage ratios. Specifically, the upper half of FIG. 17 illustrates a current schedule 161, and the lower half of FIG. 17 illustrates a tentative schedule 163. The usage ratio in the current schedule 161 is compared with that in the tentative schedule 163 to determine the degree of improvement.

In the example of FIG. 17, the calculation period of usage ratios begins at the current time point and terminates at the end time t1 of the drop-causing job. Parameter S1 in condition (2) discussed above is equivalent to the area of a hatched region 61 in the current schedule 161, which is obtained by calculating operating time of each computing node during the given calculation period in the current schedule 161 and adding up the results. Similarly, parameter S2 in condition (2) is equivalent to the area of a hatched region 62 in the tentative schedule 163, which is obtained by calculating operating time of each computing node during the given calculation period in the tentative schedule 163 and adding up the results. S2 is then divided by S1, and it is then tested whether the quotient is greater than the specified threshold P2.

The comparison discussed in FIG. 16 may find an advantage of job freezing that exceeds its consequent loss, and the evaluation in FIG. 17 may find a certain degree of improvement in the usage ratio of computing nodes. A rescheduling process is triggered by these two conditions, so that a job freezing operation is effected on the candidate jobs.

Figure 18:
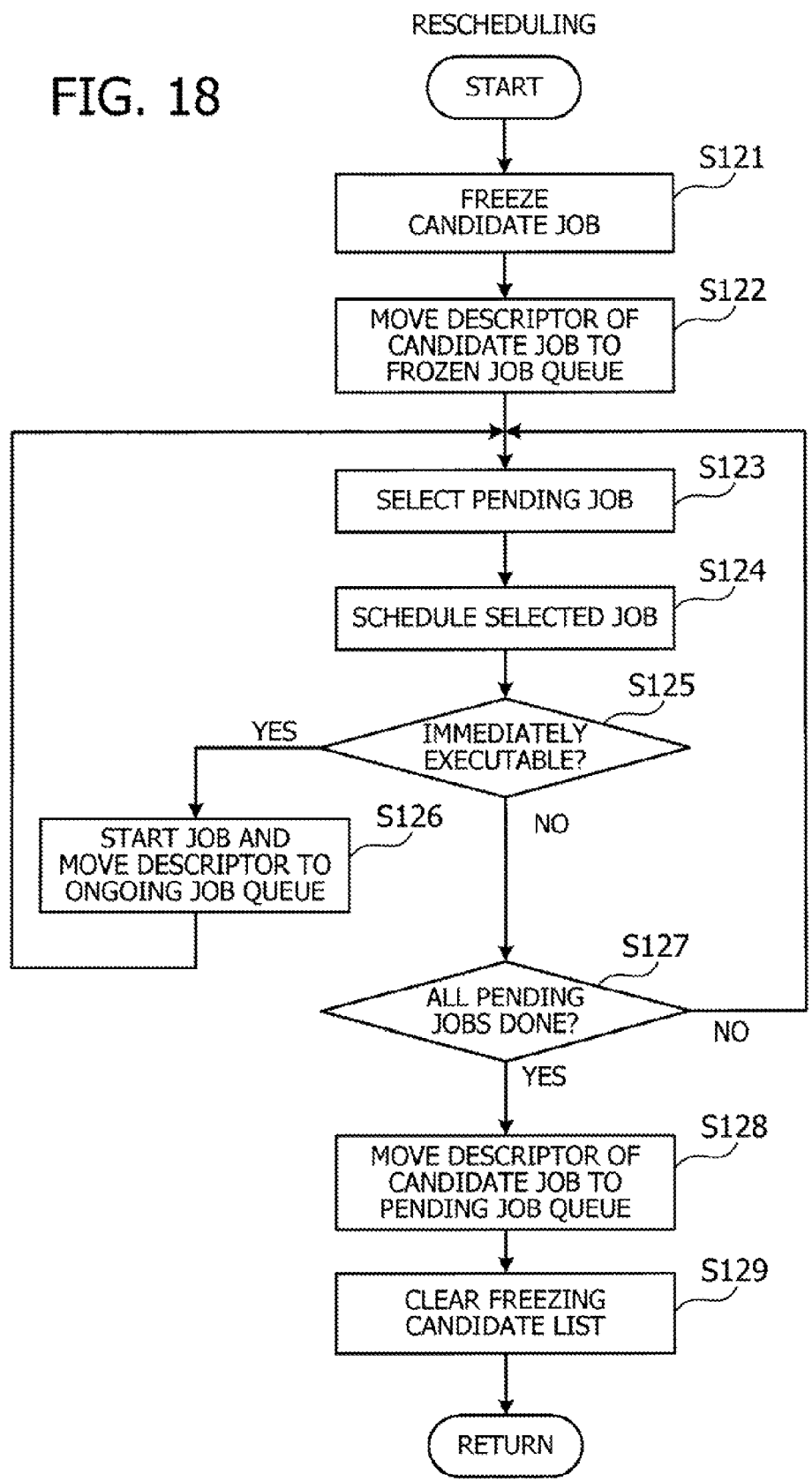
FIG. 18 is a flowchart illustrating a procedure of rescheduling jobs.

FIG. 18 is a flowchart illustrating a procedure of rescheduling jobs. Each step of FIG. 18 will be described below in the order of step numbers.

(Step S121) The job scheduling unit 150 deletes all contents of the current schedule 161 stored in the schedule data storage unit 160. The job scheduling unit 150 now freezes candidate jobs named in the freezing candidate list 151. For example, the job scheduling unit 150 requests the job operation unit 170 to freeze candidate jobs, designating their respective job identifiers. The job operation unit 170 then commands the computing nodes to suspend candidate jobs that they are executing. In response, the computing nodes stop executing the specified candidate job.

(Step S122) The job scheduling unit 150 moves job descriptors of the candidate jobs from the ongoing job queue 130 to the frozen job queue 140.

(Step S123) The job scheduling unit 150 selects pending jobs one at a time, from the top position of the pending job queue 120.

(Step S124) The job scheduling unit 150 schedules the selected job. Details of this step S124 are similar to step S103 in FIG. 9, for example.

(Step S125) The job scheduling unit 150 determines whether the selected job can be executed immediately. For example, the job scheduling unit 150 checks start time of the time period allocated for execution of the selected job at step S124. When that start time coincides with the current time, the job scheduling unit 150 determines that the selected job can be executed immediately. In this case, the job scheduling unit 150 advances to step S126. When the selected job is not immediately executable, the job scheduling unit 150 advances to step S127.

(Step S126) The job scheduling unit 150 causes the selected job to start on the computing node(s) determined at step S124. Details of this step S126 are similar to step S105 in FIG. 9. The job scheduling unit 150 then goes back to step S123.

(Step S127) The job scheduling unit 150 determines whether all pending jobs have been selected at step S123. For example, the job scheduling unit 150 determines whether the last selected pending job was what the pending job queue 120 contained as its endmost entry. If this test is true, it means that all pending jobs are done. When all pending jobs are done, the job scheduling unit 150 advances to step S128. When there remains a pending job, the job scheduling unit 150 returns to step S123.

(Step S128) The job scheduling unit 150 moves job descriptors of the candidate jobs from the frozen job queue 140 to the pending job queue 120. For example, the job scheduling unit 150 inserts those job descriptors to the top position of the pending job queue 120. This operation permits the next scheduling process to select the once-frozen jobs in preference to other pending jobs.

(Step S129) The job scheduling unit 150 clears the freezing candidate list 151. Specifically, the job scheduling unit 150 removes job identifiers from the freezing candidate list 151 and then exits from the rescheduling process.

Figure 19:
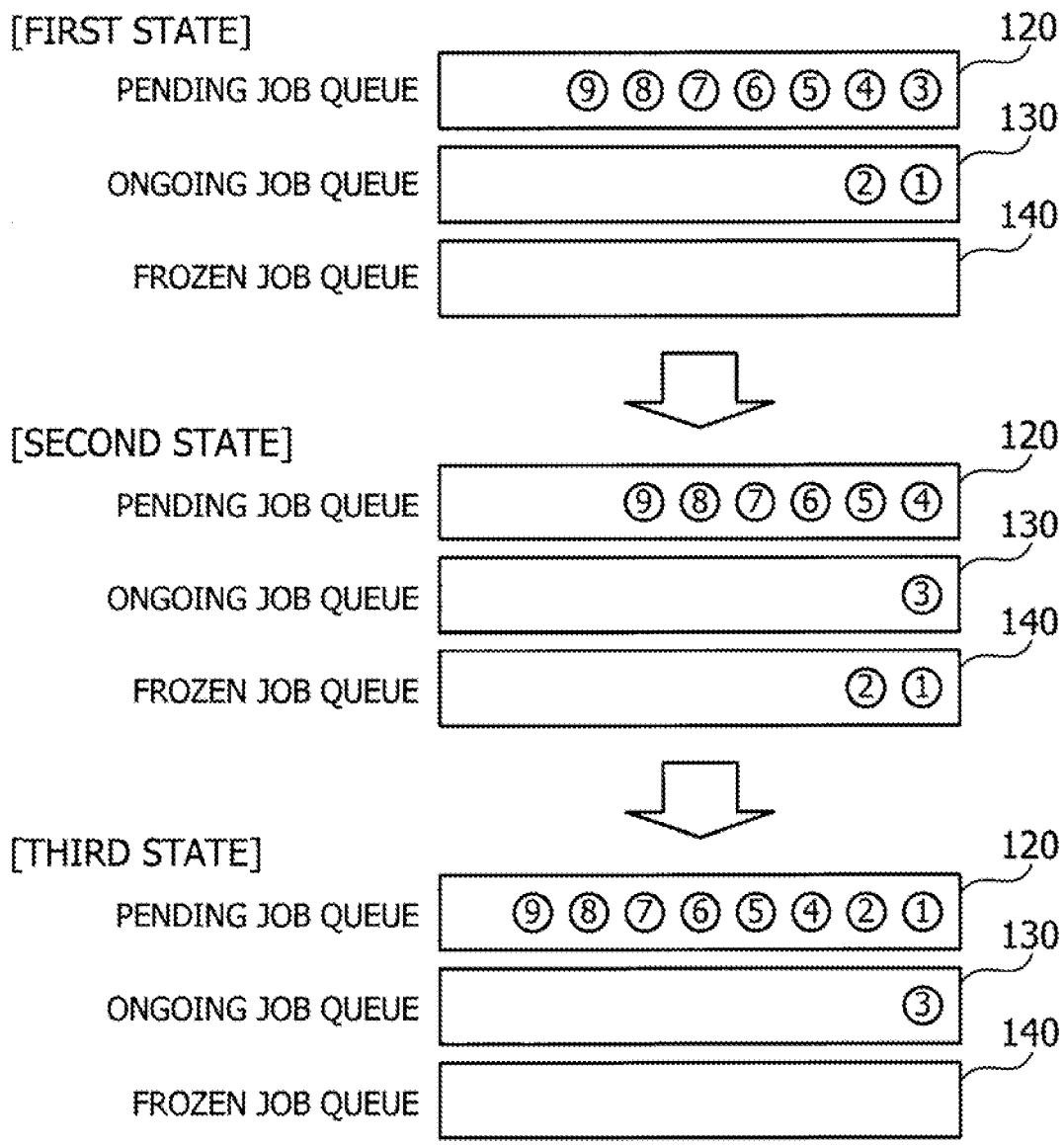
FIG. 19 depicts an example of state transitions of each queue during the course of rescheduling.

FIG. 19 depicts an example of state transitions of each queue during the course of rescheduling. In this example of FIG. 19, the circles placed in the pending job queue 120, ongoing job queue 130, and frozen job queue 140 indicate job descriptors stored therein. Seen in those circles are job identifiers of their corresponding jobs. The rightmost job descriptor in each queue is at the topmost position, i.e., the output end of the queue.

The first state in FIG. 19 indicates the queue contents at the time point when a rescheduling process is initiated. The ongoing job queue 130 contains job descriptors with job identifiers "1" and "2," indicating that two jobs 41 and 42 are executed in computing nodes at that moment. The pending job queue 120, on the other hand, contains job descriptors of seven pending jobs 43 to 49.

The second state indicates the queue contents at the time point right after the drop-causing job 43 is started on the basis of a tentative schedule while freezing two candidate jobs. More specifically, frozen at this moment are job #1 41 and job #2 42, which were in execution in the first state. The job descriptors have therefore been moved from the ongoing job queue 130 to the frozen job queue 140. The computing nodes are now executing the drop-causing job 43 because the freezing of jobs 41 and 42 has made it possible. The job descriptor of job #3 43 has therefore been moved from the pending job queue 120 to the ongoing job queue 130.

The third state in FIG. 19 indicates the queue contents when the rescheduling process is finished. Specifically, the job descriptors of job #1 41 and job #2 42 have been moved from the frozen job queue 140 to the topmost position of the pending job queue 120. This operation makes the once-frozen jobs 41 and 42 ready for execution in preference to other jobs when there is an event that triggers a scheduling process.

The second embodiment described above produces a schedule with job freezing and executes jobs according to that schedule in the case where there are good reasons for freezing jobs in terms of the comparison of advantages and losses and of the improvement of usage ratios of computing nodes. This feature prevents overuse of job freezing and avoids potential losses of job freezing, such as degradation in the processing efficiency due to failed job freezing or resuming.

Inconsistency between the order of job requests and that of job execution could lead to inequality in services to the users. The second embodiment prevents such inequality since the above-noted prevention of overuse of job freezing reduces the chance of executing jobs not in the order that they are requested. Suppose, for example, that an HPC system has a long-term job that takes a few weeks to execute. When job freezing is allowed, the scheduling process may produce a schedule that executes the long-term job by freezing some ongoing jobs that came earlier than the long-term job. In this case, the frozen jobs are not allowed to restart until the completion of the long-term job, meaning that the users who have requested those jobs are forced to wait a few weeks to receive the result of their jobs. Frequent occurrence of such incidents would spoil the equality of services to the users. The second embodiment may solve such problems associated with long-term jobs. That is, the divisor in the left side of condition (1) will have a large value in the case where a long-term job is frozen in the tentative scheduling, thus making it less likely to change the execution order of jobs (i.e., the test at step S115 in FIG. 12 results in "No"). The second embodiment minimizes the use of job freezing in this way and thus ensures equal service to the users.

In addition to the above feature, the second embodiment is designed to avoid job freezing unless the usage ratio of computing nodes is expected to improve to a meaningful extent. Pending jobs are scheduled without freezing when there is no good reason for taking risks of job freezing. This feature of the second embodiment prevents overuse of job freezing and thus contributes to more stable operation of the system.

As can be seen from the above, the second embodiment makes appropriate job scheduling possible by taking into account the balance between the expected improvement of usage ratios of computing resources and the risk of freezing jobs, as well as that between advantages and losses of job freezing.

(c) Other Embodiments and Variations

The foregoing second embodiment works with a plurality of computing nodes that serve as the resources for execution of jobs, in which each requested job is assigned to one or more computing nodes. Alternatively, a plurality of CPUs or processor cores may similarly serve as the computing resources. The proposed techniques of the second embodiment can also be applied to this implementation.

The foregoing second embodiment calculates an advantage factor on the basis of the amount of advancement of job start time. This advancement of start time happens to a pending job that would be allowed to start immediately if some ongoing jobs were frozen. It is noted, however, that the job freezing may also allow some other pending jobs to execute earlier, if not immediately. The second embodiment may therefore be modified to calculate an additional advantage of earlier execution of those pending jobs, and add it to the foregoing advantage factor of job freezing when making a scheduling decision.

The foregoing second embodiment is designed to calculate a loss factor on the basis of delay times (suspension times) of frozen jobs. However, frozen jobs may be not the only jobs that are delayed by job freezing. That is, some other jobs may also be delayed as a result of job freezing. The second embodiment may therefore be modified to take this delayed execution of jobs as an additional loss factor and add it to the foregoing loss factor of job freezing when making a scheduling decision.

The functions of the above-described embodiments may be implemented as a computer application. That is, the described functions may be realized by running a computer program designed for the purpose. This program includes a series of instructions describing what the managing node is supposed to do. A computer system executes those programs to provide the processing functions discussed in the preceding sections. The programs may be encoded in a computer-readable medium for the purpose of storage. Such computer-readable storage media include magnetic storage devices, optical discs, magneto-optical storage media, semiconductor memory devices, and other tangible storage media. Magnetic storage devices include hard disk drives (HDD), flexible disks (FD), and magnetic tapes, for example. Optical disc media include DVD, DVD-RAM, CD-ROM, CD-RW and others. Magneto-optical storage media include magneto-optical discs (MO), for example.

Portable storage media, such as DVD and CD-ROM, are used for distribution of program products. Network-based distribution of software programs may also be possible, in which case several master program files are made available on a server computer for downloading to other computers via a network.

For example, a computer stores necessary software components in its local storage device, which have previously been installed from a portable storage medium or downloaded from a server computer. The computer executes programs read out of the local storage device, thereby performing the programmed functions. Where appropriate, the computer may execute program codes read out of a portable storage medium, without installing them in its local storage device. Another alternative method is that the computer dynamically downloads programs from a server computer when they are demanded and executes them upon delivery.

It is further noted that the above processing functions may be executed wholly or partly by a central processing unit (CPU), microprocessor (MPU), digital signal processor (DSP), application-specific integrated circuit (ASIC), programmable logic device (PLD), or other processing device, or their combinations. Those devices are referred to collectively as "processors." As mentioned elsewhere, the proposed processing functions may be performed by a plurality of such processing devices. The person skilled in the art would appreciate that the term "processor" may refer not only to a single processing device, but also to a multiprocessor system including two or more processing devices.

The above sections have exemplified several embodiments and their variations. The described components may be replaced with other components having equivalent functions or may include other components or processing operations. Where appropriate, two or more components and features provided in the embodiments may be combined in a different way.

(d) Conclusion

Various embodiments have been described above. According to an aspect of those embodiments, the proposed techniques make it easier to determine whether the use of job suspension is appropriate or not in the scheduling.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a program, the program causing a computer to perform a procedure comprising:
producing a first schedule of jobs including ongoing jobs and pending jobs which is to cause a plurality of computing resources to execute the pending jobs while preventing suspension of the ongoing jobs running on the computing resources;
producing a second schedule of the jobs which allows the ongoing jobs to be suspended and rescheduled to cause the computing resources to execute the suspended jobs and pending jobs;

calculating an advantage factor representing advantages to be obtained by suspending the ongoing jobs, as well as a loss factor representing losses to be caused by suspending the ongoing jobs, based on the first and second schedules that are produced; and choosing either the first schedule or the second schedule, based on a comparison between the advantage factor and loss factor, wherein the calculating includes:

calculating the advantage factor from a total difference, between the first schedule and second schedule, of start times of a group of pending jobs scheduled to start earlier in the second schedule than in the first schedule, and calculating the loss factor from a total length of suspension times of the ongoing jobs suspended in the second schedule.

2. The non-transitory computer-readable storage medium according to claim 1, wherein:

the jobs include immediately-executable jobs that are scheduled to start immediately in the second schedule, but not immediately in the first schedule;

the calculating the advantage factor includes calculating, for each of the immediately-executable jobs, a product of a difference of start time between the first schedule and second schedule and a number of computing resources used for execution and adding up the calculated products.

3. The non-transitory computer-readable storage medium according to claim 1, wherein the calculating the loss factor includes calculating, for each of the ongoing jobs suspended in the second schedule, a product of a length of a suspension time period and a number of computing resources used for execution and adding up the calculated products.

4. The non-transitory computer-readable storage medium according to claim 1, wherein the choosing chooses the second schedule when a quotient of the advantage factor divided by the loss factor is greater than a specified threshold.

5. The non-transitory computer-readable storage medium according to claim 1, wherein the producing of the second schedule includes:

searching the first schedule to find a time period during which a usage efficiency of computing resources reaches or falls below a specified level;

identifying a job that is scheduled to start immediately after the time period that is found by the searching; and producing the second schedule such that the identified job is to be executed immediately.

6. The non-transitory computer-readable storage medium according to claim 5, wherein the choosing chooses the first schedule when the usage efficiency of the computing resources is above the specified level throughout the first schedule.

7. The non-transitory computer-readable storage medium according to claim 1, wherein the choosing chooses either the first schedule or the second schedule, with consideration of a first usage efficiency of the computing resources when the first schedule is used to execute the jobs, in comparison with a second usage efficiency of the computing resources when the second schedule is used to execute the jobs.

8. The non-transitory computer-readable storage medium according to claim 7, wherein the choosing chooses the second schedule when both of the comparison between the advantage factor and loss factor and the comparison between the first usage efficiency and second usage efficiency indicate that the second schedule is more proper than the first schedule.

9. The non-transitory computer-readable storage medium according to claim 7, wherein the choosing chooses the second schedule when a quotient of the second usage efficiency divided by the first usage efficiency is greater than a specified threshold.

10. The non-transitory computer-readable storage medium according to claim 1, wherein the procedure further comprises causing the computing resources to execute the ongoing jobs and pending jobs according to either the first schedule or the second schedule that the choosing has chosen.

11. A method of job scheduling, comprising:

producing, by a processor, a first schedule of jobs including ongoing jobs and pending jobs which is to cause a plurality of computing resources to execute the pending jobs while preventing suspension of the ongoing jobs running on the computing resources;

producing, by the processor, a second schedule of the jobs which allows the ongoing jobs to be suspended and rescheduled to cause the computing resources to execute the suspended jobs and pending jobs;

calculating, by the processor, an advantage factor representing advantages to be obtained by suspending the ongoing jobs, as well as a loss factor representing losses to be caused by suspending the ongoing jobs, based on the first and second schedules that are produced; and choosing, by the processor, either the first schedule or the second schedule, based on a comparison between the advantage factor and loss factor, wherein the calculating includes:

calculating the advantage factor from a total difference, between the first schedule and second schedule, of start times of a group of pending lobs scheduled to start earlier in the second schedule than in the first schedule, and calculating the loss factor from a total length of suspension times of the ongoing jobs suspended in the second schedule.

12. An information processing apparatus comprising a processor configured to perform a procedure including:

producing a first schedule of jobs including ongoing jobs and pending jobs which is to cause a plurality of computing resources to execute the pending jobs while preventing suspension of the ongoing jobs running on the computing resources;

producing a second schedule of the jobs which allows the ongoing jobs to be suspended and rescheduled to cause the computing resources to execute the suspended jobs and pending jobs;

calculating an advantage factor representing advantages to be obtained by suspending the ongoing jobs, as well as a loss factor representing losses to be caused by suspending the ongoing jobs, based on the first and second schedules that are produced; and choosing either the first schedule or the second schedule, based on a comparison between the advantage factor and loss factor, wherein the calculating includes:

calculating the advantage factor from a total difference, between the first schedule and second schedule, of start times of a group of pending jobs scheduled to start earlier in the second schedule than in the first schedule, and calculating the loss factor from a total length of suspension times of the ongoing jobs suspended in the second schedule.

* * * * *